(12) United States Patent
Effros et al.

(10) Patent No.: US 10,965,538 B2
(45) Date of Patent: Mar. 30, 2021

(54) SYSTEMS AND METHODS OF NETWORK ANALYSIS AND CHARACTERIZATION

(71) Applicant: California Institute of Technology, Pasadena, CA (US)

(72) Inventors: Michelle Effros, Pasadena, CA (US); Tracey C. Ho, Pasadena, CA (US); Ralf Koetter, Munich (DE); Shirin Jalali, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 347 days.

(21) Appl. No.: 15/063,336

(22) Filed: Mar. 7, 2016

(65) Prior Publication Data
US 2016/0191335 A1 Jun. 30, 2016

Related U.S. Application Data

(63) Continuation of application No. 13/364,195, filed on Feb. 1, 2012, now Pat. No. 9,282,007.

(60) Provisional application No. 61/481,648, filed on May 2, 2011.

(51) Int. Cl.
| *H04L 12/26* | (2006.01) |
| *H04W 24/02* | (2009.01) |
| *H04L 12/24* | (2006.01) |
| *H04L 12/46* | (2006.01) |
| *H04L 12/721* | (2013.01) |

(52) U.S. Cl.
CPC ............ *H04L 41/145* (2013.01); *H04L 43/50* (2013.01); *H04L 12/462* (2013.01); *H04L 41/12* (2013.01); *H04L 45/26* (2013.01); *H04W 24/02* (2013.01)

(58) Field of Classification Search
CPC ....... H04L 12/24; H04L 12/26; H04L 41/145; H04L 43/30
See application file for complete search history.

(56) References Cited

U.S. PATENT DOCUMENTS

| 6,675,328 | B1 | 1/2004 | Krishnamachari et al. |
| 7,113,919 | B1 | 9/2006 | Norris |
| 7,567,523 | B2 | 7/2009 | Black et al. |
| 9,282,007 | B2 | 3/2016 | Effros et al. |
| 2002/0161914 | A1 | 10/2002 | Belenki |
| 2005/0265321 | A1* | 12/2005 | Rappaport ............ H04L 41/145 370/352 |
| 2010/0020722 | A1 | 1/2010 | Farkas et al. |
| 2010/0226262 | A1 | 9/2010 | Liu et al. |
| 2011/0044205 | A1 | 2/2011 | Radulescu et al. |

(Continued)

OTHER PUBLICATIONS

Cannons et al., "Network routing capacity", IEEE Transactions on Information Theory, 52(3):777-788, Mar. 2006.

(Continued)

*Primary Examiner* — Bijan Mapar
(74) *Attorney, Agent, or Firm* — KPPB LLP

(57) ABSTRACT

Systems and methods for characterizing networks are disclosed. In several embodiments, a network analyzer applies a network analysis to a network that replaces components of the network in a model of the network with equivalent or bounding models. The network analyzer can then characterize the simplified model of the network and an assessment can be made concerning the accuracy of the characterization of the network.

20 Claims, 8 Drawing Sheets

(56) References Cited

U.S. PATENT DOCUMENTS

2013/0007264 A1   1/2013   Effros et al.

OTHER PUBLICATIONS

Dougherty et al., "Nonreversibility and equivalent constructions of multiple-unicast networks", IEEE Transactions on Information Theory, 52(11): 5067-5077, Nov. 2006.
Effros, "Capacity bounds for networks of broadcast channels", Proceedings of the IEEE International Symposium on Information Theory, Austin, TX, Jun. 2010, pp. 580-584.
Effros, "On capacity outer bounds for a simple family of wireless networks", Information Theory and Applications Workshop, San Diego, CA, 2010.
Effros, "On Dependence and Delay: Capacity Bounds for Wirelesss Networks", IEEE Wireless Communications and Networking Conference, Paris, France, Apr. 2012 (to appear), 5 pgs.
Effros, "On source and networks: can computations tools derive information theoretic limits?", Allerton Conference on Communication, Control, and Computing, 2011.
Gu et al., "On approximating the rate region for source coding side information", In the Proceedings of the IEEE Information Theory Workshop, Lake Tahoe, CA, Sep. 2007, pp. 432-435.
Gu et al., "On approximating the rate regions for lossy source coding with coded and uncoded side information", In the Proceedings of the IEEE International Symposium on Information Theory, Toronto, Canada, Jul. 2008, pp. 2162-2166.
Han, "The capacity region of general multiple-access channel with certain correlated sources", Information and Control, Jan. 1979, vol. 40, pp. 37-60.
Harvey et al., "On the capacity of information networks", IEEE Transactions on Information Theory, 52(6):2345-2364, Jun. 2006.
Ho, "Polynomial-time algorithms for coding across multiple unicasts", ArXiv e-prints, Apr. 2006.
Ho et al., "On Equivalence Between Network Topologies", Allerton Annual Conference on Communications, Control, and Computing, Monticello, IL, Sep. 2010, 8 pgs., arXiv:1010.0654, Oct. 4, 2010.
Jalali et al, "On the separation of lossy source-network coding and channel coding in wireline networks", Proceedings of the IEEE International Symposium on Information Theory, Austin, TX, Jun. 2010, pp. 500-504.
Jalali et al., "On distortion bounds for dependent sources over wireless networks", IEEE International Symposium on Information Theory, Saint Petersburg, Russia, Aug. 2011.
Jalali et al., "On the impact of a single edge on the network coding capacity", Information Theory and Applications Workshop, San Diego, CA, 2011, 5 pgs., arXiv:1607.06793.
Jalali et al., "On the separation of lossy source-network coding and channel coding in wireline networks", ArXiv e-prints, May 2010.
Jalali et al., "Separation of source-network coding and channel coding in wireline networks", Information Theory and Applications Workshop, San Diego, CA, Feb. 2011.
Koetter et al., "A theory of network equivalence—Part I: Point-to-point channels", IEEE Transactions on Information Theory, Feb. 2011, pp. 972-995.
Koetter et al., "A Theory of Network Equivalence—Part II: Multiterminal Channels", Submitted to IEEE Transactions on Information Theory, Apr. 14, 2010.
Koetter et al., "Beyond network equivalence", Allerton Annual Conference on Communications, Control, and Computing, Monitcello, IL, Sep. 2009.
Koetter et al., "On a theory of network equivalence", Proceedings of the IEEE Information Theory Workshop, Volos, Greece, Jun. 2009, pp. 326-330.
Koller et al., "Algorithim 3.5—Finding the class PDAG characterizing the P-map of a distribution P", Probabilistic Graphical Models, 2009, pp. 89.
Schrijver, "A combinatorial algorithm minimizing submodular functions in strongly polynomial time", Journal of Combinatorial Theory, vol. 80, 2000, pp. 346-355.
Shwarz, "Estimating the dimension of a model", Ann. Statist., 6, 1978, pp. 461-464.
Song et al., "Zero-error network coding for acyclic networks", IEEE Transactions on Information Theory 52(6):2345-3139, Jul. 2003.
Subramaniam et al., "A simple algebraic formulation for the scalar linear network coding problem", ArXiv e-prints, Jul. 2008.
Yeung, "A Framework for Linear Information Inequalities", IEEE Transactions on Information Theory, vol. 43, No. 6, Nov. 1997, pp. 1924-1934.
Office Action for U.S. Appl. No. 13/364,195, dated Oct. 10, 2014, 19 pgs.
*Motio, Inc. V. BSP Software LLC, BrightStar Partners, Inc., and Avent, Inc.*, Case No. 4:12-CV-647, 154 F. Supp. 3d 434, District Court, ED Texas, 2016, 6 pgs.

\* cited by examiner

SYSTEMS AND METHODS OF NETWORK ANALYSIS AND CHARACTERIZATION

CROSS-REFERENCE TO RELATED APPLICATION

This application is a continuation of U.S. patent application Ser. No. 13/364,195 entitled "Systems and Methods of Network Analysis and Characterization" to Effros et al., filed Feb. 1, 2012, which application claims priority under 35 U.S.C. § 119(e) to U.S. Provisional Patent Application Ser. No. 61/481,648, filed May 2, 2011, the disclosure of which is incorporated by reference herein in its entirety.

STATEMENT OF FEDERALLY SPONSORED RESEARCH

This invention was made with government support under W911NF-07-1-0029 awarded by DARPA, CCF-1018741 awarded by the National Science Foundation, and FA9550-10-1-0166 awarded by Air Force (AFOSR). The government has certain rights in the claimed inventions.

FIELD OF THE INVENTION

The present invention generally relates to network analysis and more specifically relates to the calculation of inner and outer bounds on critical network characteristics such as capacity and joint source-channel coding regions and to the creation of simplified network models that preserve or bound such properties from the original network.

BACKGROUND

A communication network includes a collection of communicating devices (e.g., telephones, modems, computers, PDAs, video game consoles, routers, sensors) that can transmit and receive signals through a variety of communication media (e.g., wires, cables, air, water, space) for the purpose of delivering data (e.g., text, images, audio, video, sensor measurements) across space or time. There are a wide variety of communication networks in use today. These include, but are not limited to, traditional (wireline) telephone networks, wireless phone networks (e.g., cellular phone networks, satellite phone networks), local area networks (LANs), wide area networks (WANs), the Internet, cable television networks, RFID networks, and sensor networks.

There are many metrics used in characterizing the performance of a network. One common measure is the maximal data rate at which the network can deliver information. (Maximal data rates are sometimes described using terms such as the "network bandwidth," "data band-width," "information rate," or "network capacity." The term "bandwidth" in the context of data networks is typically used to quantify the amount of data delivered per unit of time. The term "capacity" is used to refer to the maximum possible data rate or collection of data rates that a link, path, or network can deliver per unit time.) In other cases, it may be useful to describe the minimal distortions with which a network can deliver a collection of sources to their intended destinations, the latency or delay suffered in information delivery, the robustness of the network to component failures or adversarial attack, the extent to which information can be protected against eavesdropping, and so on. The metric of interest in analyzing a given network is often highly dependent on the application. For example, transmissions of live voice and video are far more sensitive to delay than is email, even when both data types travel through the same network.

Analyzing a network's performance is useful for a variety of applications. These include but are not limited to the following examples. Network users who wish to compare a variety of available networks can use network analysis to determine which network will give the best performance for their needs. Network designers interested in building new networks or reconfiguring old ones can use network analysis to optimize design choices with respect to relevant network metrics. Network analysis is also of potential use for guiding research and development. For example, by analyzing both metrics that provide theoretical bounds on a network's best possible performance and metrics that measure current performance using existing algorithms, researchers and entrepreneurs can distinguish between problems for which current solutions already achieve good performance and those where large gaps between theory and practice suggest a greater potential for advance. Network service providers can use network analysis to discover underlying structure in their networks, understand how much enabling a new service impacts existing services, inform pricing, guide network design, and improve network upgrades. Techniques for estimating network performance are also important for overlay network routing, traffic engineering, and capacity planning support.

Theoretical analysis of network performance is often extremely difficult. For example, the capacity of a single memoryless, noisy point-to-point channel is well-characterized, but the capacities for many memoryless three-node networks (e.g., non-degraded broadcast and relay channels), most networks that can be built from memoryless, noisy point-to-point channels, and most channels with memory remain unsolved. A key challenge is that the capacities of a network's components do not necessarily determine the capacities of networks that can be built from those components. For example, consider a 4-node network in which node 1 transmits to nodes 2 and 3 through a broadcast channel and nodes 2 and 3 transmit to node 4 through a multiple access channel. Assume that the noise in the broadcast channel is independent of that in the multiple access channel. The capacity region for the complete network cannot be solved by combining the capacity regions of the two component channels. For example, the maximal rate at which node 1 can send information to node 4 is different when the broadcast channel is physically degraded than when the broadcast channel is stochastically degraded even though the capacity of the physically and stochastically degraded broadcast channels are identical.

One special family of networks for which the network capacity is relatively well-understood is the family of networks built from noiseless capacitated links (bit pipes). In these networks (bit-pipe networks) under some very structured connection types, network capacities are precisely characterized. For example, for multicast connections, where all messages start at a single node in the network and each receiver wishes to reconstruct all messages transmitted by that source node, the capacity is fully characterized for all network topologies. Unfortunately, finding capacities for general connection types remains a difficult problem. For example, the capacity of a network with single multicast connection is solved, but the capacities of most networks with two or more multicast connections remain unsolved.

For the family of noiseless wireline networks under general connection types, information theoretic inequalities can be used to find outer bounds on network capacities. The linear outer bound described in R. W. Yeung, "A framework for linear information inequalities," *IEEE Transactions on Information Theory*, 43(6): 1924-1934, November 1997 (the disclosure of which is incorporated by reference herein in its entirety) gives the tightest outer bound implied by Shannon-type inequalities. This bounding technique has been implemented as the software programs Information Theoretic Inequalities Prover (ITIP) and XITIP. The program has complexity exponential in the number of links in the network and can thus only be used to compute capacity bounds for relatively small problem instances.

Since signals transmitted through real communication networks are corrupted by physical phenomena such as noise and attenuation, the tools for computing capacities of bit-pipe networks cannot be directly applied to compute capacities of real networks. As a result, the tools used to approximate the capacities of real networks are quite different from the tools described above. The tools used to study large networks are typically empirical, measuring achieved rate, available bandwidth, and bulk transfer capacity (BTC) across a single link or path. A network manager with administrative access to network routers and/or switches can measure bandwidth metrics by gathering data rate statistics at all accessible nodes (e.g., routers and switches). Since such access is typically available only to administrators and not to end users, end users can often only estimate the bandwidth of individual links or paths from end-to-end measurements. As a result, many such mechanisms yield only partial and unreliable assessments of a network's capacity.

SUMMARY OF THE INVENTION

Systems and methods are described for systematically computing true bounds on the performance of general networks under general connection types. One embodiment includes a processor configured to obtain an initial model of the communication network. In addition, the processor is further configured to perform at least one substitution that replaces a component of the initial network model with an equivalent or bounding model to produce a simplified network that is capable of being characterized by the network analyzer, and the processor is also configured to characterize the initial model by characterizing the simplified network model.

In a further embodiment, obtaining an initial model of the communication network comprises obtaining a definition of the nodes of the network, a definition of the structure of the network, and a definition of the connections within the network.

In another embodiment, the definition of the structure of the network includes the definition of at least one capacitated bit pipe.

In a still further embodiment, the definition of the structure of the network includes the definition of at least one stochastic channel.

In still another embodiment, the processor is configured to factor network models by partitioning the network model into a series of independent network components.

In a yet further embodiment, the at least one substitution includes substituting an equivalent or bounding network model for at least one stochastic component of the network model.

In yet another embodiment, the at least one stochastic component is replaced with an equivalent or bounding bit-pipe model.

In a further embodiment again, the at least one substitution includes substituting an equivalent or bounding network model for at least one deterministic component of the network model.

In another embodiment again, the at least one substitution includes modifying at least one bit-pipe component of the network model.

In a further additional embodiment, the processor is configured to bound the accuracy of at least one of the models substituted for a component of the network model to evaluate the impact of the substitution on the accuracy with which the network analyzer can characterize the network.

In another additional embodiment, the processor is configured to characterize the simplified network model by outputting the simplified network model.

In a still yet further embodiment, the processor is configured to characterize the simplified network model by bounding a network performance characteristic of the simplified network model.

In still yet another embodiment, the network performance characteristic is a bound with respect to the capacity region of the simplified network model.

In a still further embodiment again, the network performance characteristic is a bounding network on the capacity region of the simplified network model.

In still another embodiment again, the network performance characteristic is a bound on the joint source-channel coding region of the simplified network model.

In a still further additional embodiment, the network performance characteristic is a bounding network on the joint source-channel coding region of the simplified network model.

In still another additional embodiment, the processor is further configured to assess the bounding accuracy of the characterization of the simplified network model.

In a yet further embodiment again, the processor is configured to assess the bounding accuracy of the characterization by comparing inner and outer bounds on the network performance.

In yet another embodiment again, the processor is configured to assess the bounding accuracy of the characterization by comparing inner and outer bounding network models of the simplified network model.

In a further additional embodiment again, the processor is configured to perform the comparison on a link-by-link basis.

In another additional embodiment again, the processor is configured to perform the comparison on a cut-by-cut basis.

In a still yet further embodiment again, the processor is configured to repeat the at least one substitution using at least one alternative substitution in the event that the bounding accuracy of the characterization of the simplified network model is not sufficiently accurate.

In still yet another embodiment again, the processor is configured to factor network models by partitioning the network into a series of independent network components, and the processor is configured to repeat the factoring of the network model and the at least one substitution using at least one alternative substitution in the event that at least one analysis criterion is not satisfied.

In a still yet further additional embodiment, the processor is further configured to perform the at least one substitution as part of a recursive substitution process in which components of the initial network model are replaced with equivalent or bounding models to produce a simplified network that is capable of being characterized by the network analyzer.

In still yet another additional embodiment, the recursive substitution process is a hierarchical substitution process.

Another further embodiment includes a processor configured to obtain an initial model of the communication network. In addition, the processor is configured to factor the initial network model by partitioning the network into a series of independent network components, and the processor is also configured to characterize the initial model by characterizing the simplified network model.

An embodiment of the method of the invention includes obtaining an initial model of the communication network, performing at least one substitution that replaces components of the initial network model with equivalent or bounding models to produce a simplified network that is capable of being characterized by the network analyzer, and characterizing the initial model by characterizing the simplified network model.

DETAILED DESCRIPTION

Figure 1:
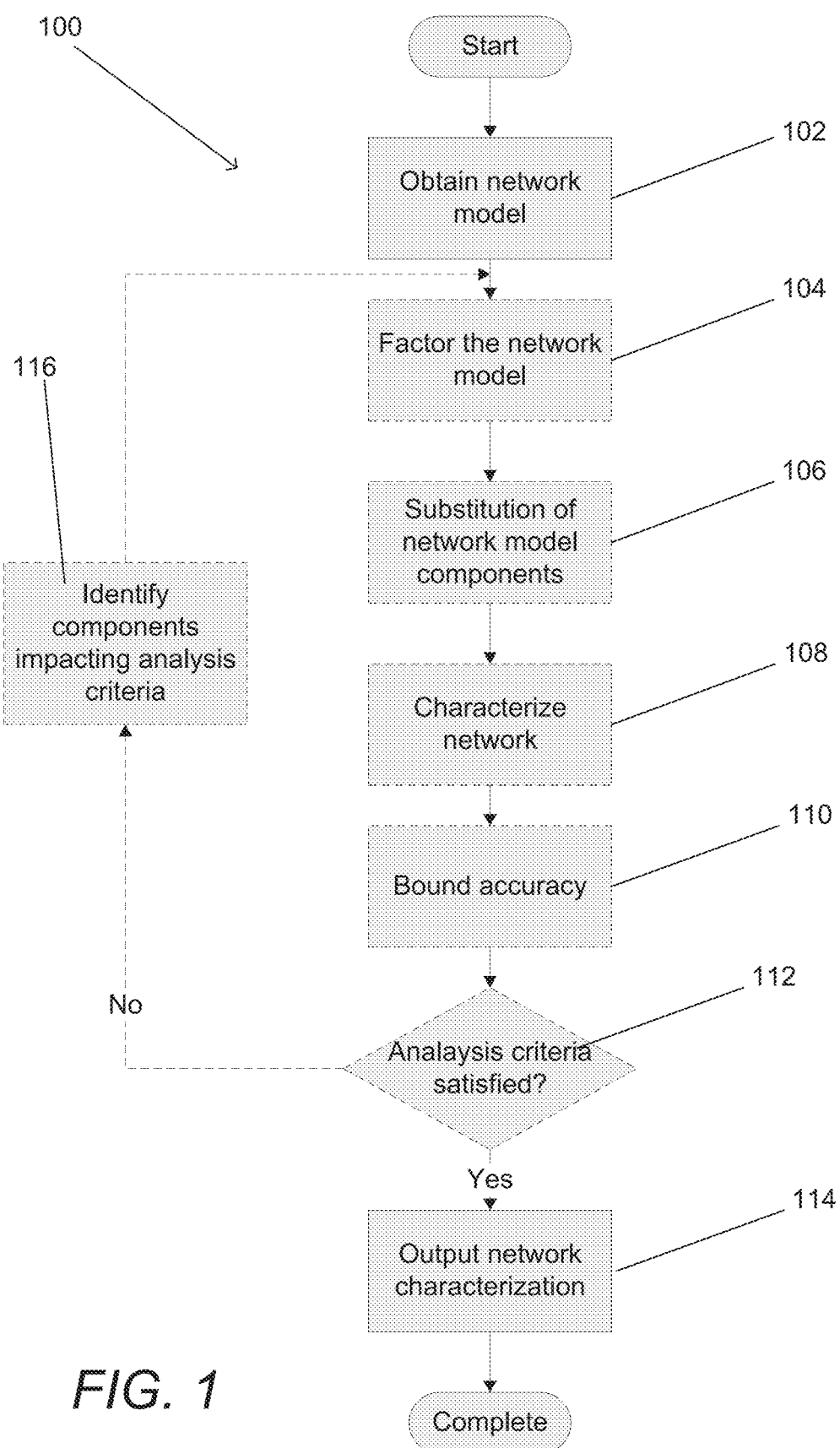
FIG. 1 is a flow chart illustrating a process for characterizing a network in accordance with an embodiment of the invention.

Turning now to the drawings, systems and methods for characterizing networks are disclosed. In several embodiments, a network analyzer (typically implemented via software on a computing device) analyzes one or more performance characteristics of a network with respect to a collection of connections to be established across the network. The network analyzer can characterize the network in a variety of ways depending upon the application for which the analysis is applied. Examples of performance characteristics that can be characterized by a network analyzer in accordance with embodiments of the invention include (but are not limited to) the capacity region of the network, the joint source-channel coding region of the network, or the adversarial capacity of the network. Outputs of the network analyzer can take the form of complete characterizations or responses to simpler queries such as "Can rates $(R_s : s \in \mathcal{S})$ for connections $\mathcal{S}$ be supported by the network" A detailed discussion of the performance characteristics that can be characterized by a network analyzer in accordance with embodiments of the invention is provided below. In many embodiments, the characterization involves providing an inner bound and/or an outer bound on one or more specific characteristics of the network. An inner (outer) bound on a capacity or joint source-channel region is a subset (superset) of that region. In other instances of the invention, the network characterization takes the form of another network (a bounding network) that bounds a characteristic of the original network. When the bounding network for the outer bound (the outer bounding network) and the bounding network for the inner bound (the inner bounding network) are identical, the bounding network is equivalent to the original network since its performance according to the measure of interest (e.g., its capacity or joint-source channel coding region) is identical to that of the original network. Network characterization can also involve characterizing the accuracy of any of the bounds produced by the network analyzer.

In many embodiments, a network analyzer is not capable of directly characterizing an initial model of a network provided to the network analyzer. Therefore, a substitution process is performed to modify the network so that it is capable of being characterized. The substitution process involves replacing one or more components of the network with equivalent models or inner or outer bounding models (collectively, bounding models). If the inner bounding model and the outer bounding model for a particular component are identical, then that model is an equivalent model. If some replaced components are replaced by inner (outer) bounding models while any other replaced components are replaced by equivalent models, then the result is an inner (outer) bounding network. If all components are replaced by equivalent models, then the network is an equivalent network. The process can be performed iteratively until the modifications result in a network model that is capable of being analyzed by the network analyzer within an acceptable amount of time. The resulting network model is either equivalent to or an inner (outer) bound on the original network. In several embodiments, the network analyzer characterizes the network by outputting the modified network. As is discussed further below, the network analyzer can also characterize the modified network in a variety of ways including but not limited to providing one or more bounds on a specific characteristic of the network.

In a number of embodiments, a network analyzer characterizes a network using a sequence of processes that are described further below. A network model is first entered into the analyzer. In some embodiments, the model is described by deterministic components with no stochastic elements (e.g., the network model only includes error-free capacitated links). In other embodiments, the model is described by components with one or more stochastic elements. In other embodiments, the network is described by a combination of stochastic and deterministic elements. In several embodiments, the model can be factored into a collection of independent components. Factoring is the process of partitioning the network into independent subnetworks. Combining the separate analyses then enables an analysis of the entire network. In a number of embodiments, a substitution process is applied to the network model in order to obtain a modified network that is either equivalent to or is an inner or outer bound on the original network and is capable of being characterized by the network analyzer. When a network model is obtained through factoring and/or substitution that is capable of being characterized, a network analyzer in accordance with embodiments of the invention can bound a characteristic of the network. If the bounding network produced by the substitution is an inner (outer) bounding network, then an inner (outer) bounding algorithm is applied, yielding an inner (outer) bound on the network performance characteristic of the original network. If the bounding network is an equivalent network, then the network analyzer can apply an inner bounding algorithm to get an inner bound, apply an outer bounding algorithm to obtain an outer bound, or apply both to obtain both inner and outer bounds. In a number of embodiments, the accuracy of the resulting bounds on the characteristic of the network (e.g., capacity or joint source-channel coding region) is calculated. In several embodiments, accuracy is bounded by comparing inner and outer bounds. In other embodiments, accuracy is bounded by comparing the bounding networks. Network analyzers and processes for characterizing networks, including processes for performing substitution, in accordance with embodiments of the invention are discussed further below.

An Overview of Network Characterization Processes

A process for characterizing a network including various optional processes that can be performed in accordance with embodiments of the invention is illustrated in FIG. 1. The process 100 commences with the specification (102) of a network model. In many embodiments, the network model is provided to the network analyzer. In several embodiments, the network analyzer provides a user interface enabling the specification of the network model. Network models and the manner in which they are specified are discussed further below. Once a network model has been obtained, the process can optionally involve factoring (104) the network model. As is described below, factoring is the process of partitioning the network into a series of independent subnetworks. In a number of embodiments, factoring is unnecessary as the network model is entered by describing a collection of independent components and the nodes that communicate through them. For many networks, some or all of the network model cannot be factored. As is discussed further below, the portion of the network model that cannot be factored can be substituted with a network model that is either equivalent or is an inner or outer bound that can be factored. When a substitution is performed to facilitate factoring, the substitution can be referred to as a bounding factorization.

A process involving the substitution of network components is then performed (106) to provide a network model that is either equivalent to or is an inner or outer bound on the original network and is capable of being characterized by the network analyzer. In a number of embodiments, the substitutions are hierarchical. In other embodiments, any of a variety of strategies can be utilized to select substitutions to perform. The output of the network analyzer can be the network model, which can be analyzed manually, or using a separate network analysis tool. The network model can also provide insight into the architecture of the current network and the design of future networks.

In many embodiments, the network analyzer characterizes the network (108) by determining relevant bounds (i.e., inner, outer, or inner and outer bounds) on one or more characteristics of the network. When the network analyzer characterizes the network, the network analyzer can also bound (110) the accuracy of the bounds. The accuracy of the characterization can be bounded using techniques including (but not limited to) comparing inner and outer bounds, or comparing models (for example, in some embodiments comparisons are made on a link-by-link basis; in others, comparisons are made on a cut-by-cut basis).

When the network is characterized, the process determines (112) whether one or more predetermined analysis criteria are satisfied, indicating that the process can complete by outputting (114) a final network characterization. In several embodiments, the network analysis criteria include (but are not limited) to criteria associated with the complexity of the network model, whether the network model can be further factored, the bounds and/or the accuracy of the bounds. Typically, the process iterates when factoring the network involves inserting a bounding factorization, or the bounding accuracy does not satisfy a predetermined criterion. When the process iterates, the process can analyze the network model and/or the characterization of the network model to identify (116) components that are impacting the analysis criteria. The process can then iteratively repeat using different factorizations (104), different sequences of substitutions (106), or both until the analysis criteria are satisfied. At which point, the process outputs (114) the network characterization.

Although specific processes are illustrated in FIG. 1, any of a number of processes can be utilized to characterize a network in accordance with the requirements of a specific application. The various processes shown in FIG. 1 involve the use of a network model. The manner in which a network can be described using a network model and the manner in which the various processes shown in FIG. 1 operate on the network model are discussed further below.

Definition: Network Models

The nature of the network model definition used by a network analyzer in accordance with an embodiment of the invention typically is dependent upon the nature of a specific application. Two examples of approaches to the modeling of communication networks are the graph-theoretic approach, which treats networks as graphs including nodes connected by noise-free, capacitated links that can be used error free up to a certain capacity, and the information theoretic approach, which treats networks as stochastic relationships between the input and outputs variables at a collection of nodes. Models used in embodiments of the invention include but are not limited to the example model types described below.

In some embodiments, a network analyzer models a network as a directed graph $\mathcal{N} = (\mathcal{V}, \mathcal{E})$, where $\mathcal{V}$ and $\mathcal{E} \subseteq \mathcal{V} \times \mathcal{V}$ denote the set of nodes and links, respectively. Each directed link $e=(v_1, v_2) \in \mathcal{E}$ represents a noiseless link (bit pipe) of capacity $C_e$ from node $v_1$ to node $v_2$ in $\mathcal{N}$. For each node v, In(v) and Out(v) denote the set of incoming and outgoing links of node v. For each edge e, Start(e) and End(e) denote the input and output nodes for edge e.

Noiseless capacitated links are typically employed to model cables or wires in wireline networks. In real networks, signal transmissions over cables and wires suffer from various forms of signal degradation and/or corruption by noise. Wireline channels are therefore more accurately modeled using a distribution that describes the statistical relationship between the transmitted and received signals. In some embodiments, a network analyzer models a network as a directed graph $\mathcal{N} = (\mathcal{V}, \mathcal{E})$, where directed link $e=(v_1, v_2) \in \mathcal{E}$ represents a noisy channel with conditional distribution $p_e(y_e|x_e)$ describing the distribution on the channel's output $y_e$ at node $v_2$ when the channel's input at node $v_1$ is $x_e$.

In some embodiments, a network analyzer models a network as a directed graph $\mathcal{N} = (\mathcal{V}, \mathcal{E}_1 \cup \mathcal{E}_2)$ where each $e \in \mathcal{E}_1$ describes a noiseless capacitated link of capacity $C_e$ and each $e \in \mathcal{E}_2$ describes a noisy channel with conditional distribution $p_e(y_e|x_e)$.

In wireless networks, signals are transmitted directly into a node's surrounding environment (e.g., air, water, space) rather than being transmitted over a cable or wire. Wireless transmissions suffer signal degradation and/or corruption by noise. In addition, signals broadcast into their surrounding environment may be overheard by communication devices other than their intended receiver(s) and/or may suffer interference caused by distinct signals intended for the same receiver or other receivers in the network. Such phenomona do not readily lend themselves to direct modeling using graph theoretic approaches. Broadcast, multiple access, and interference channel models are all examples of simple channel models used to model the phenomena associated with wireless transmissions. All of these channel types are instances of information theoretic multiterminal channel models. In a general memory less multiterminal channel model with m inputs and n outputs, a network is modeled by: (1) a collection $\mathcal{V}$ of channel nodes, (2) a pair $(v_x, v_y)$ of correspondences such that for each $i \in \{1, \ldots, m\}$ and $j \in \{1, \ldots, n\}$ $v_x(i) \in \mathcal{V}$ describes the node transmitting network input $x_i$ and $v_y(j) \in \mathcal{V}$ describes the node receiving network output $y_j$, and (3) a distribution $p(y_1, y_2, \ldots, y_n | x_1, x_2, \ldots, x_m)$ describing the conditional distribution on the network outputs given the network inputs. When the channel has memory, then the distribution on channel outputs depends on current and past channel inputs. The channel inputs and outputs may be scalars or vectors. Multiple transmissions from a single node $(v_x(i_1)=v_x(i_2)$ for some $i_1 \neq i_2$, $i_1, i_2 \in \{1, \ldots, m\})$ and/or multiple receptions at a single node $(v_y(j_1)=v_y(j_2)$ for some $j_1 \neq j_2$, $j_1, j_2 \in \{1, \ldots, n\})$ are employed in some instances of this invention. General multiterminal channel models are employed in many instances of this invention.

A network analyzer in accordance with embodiments of the invention can build an initial model of a network using well-understood processes based upon distribution estimation. For the purposes of network information theory, these processes model the stochastic relationship of input and output variables at nodes in the network. In some embodiments, these stochastic relationships capture network features including (but not limited) the statistics of the noise, the statistical dependence, if any, of the noise on the transmitted signal or signals, interference (if any) between transmitted signals, signal attenuation, and multipath fading characteristics. In many embodiments, these stochastic relationships are estimated by observing the statistics of network inputs and outputs at nodes in a network. In several embodiments, the network analyzer obtains network statistics in real time from a network administration application. In other embodiments, the network analyzer processes collected data offline. In several embodiments, the network analyzer employs components from a library of components as connected by a network designer.

Many communication networks employ both wireless and wireline transmissions. For example, while much of the core of the internet is a wireline network, that network is frequently accessed with wireless devices like laptops, mobile phones, and PDAs. Conversely, while many sensor networks employ wireless technology at the sensors, the collected data is often processed and shared over wireline networks. To accommodate such hybrid networks, in some instances of the invention, the network model includes both multiterminal channels and (noisy and/or noiseless) wireline links.

In some instances, portions of the network model are entered into the network analyzer by describing the vertices and directed edges of a graph. In several instances, portions of the network model are entered into the network analyzer by describing a collection of vertices, one or more distributional models, and the correspondences describing their inputs and outputs. In many instances, the network model is entered into the network analyzer using a graphical user interface.

Figure 2:
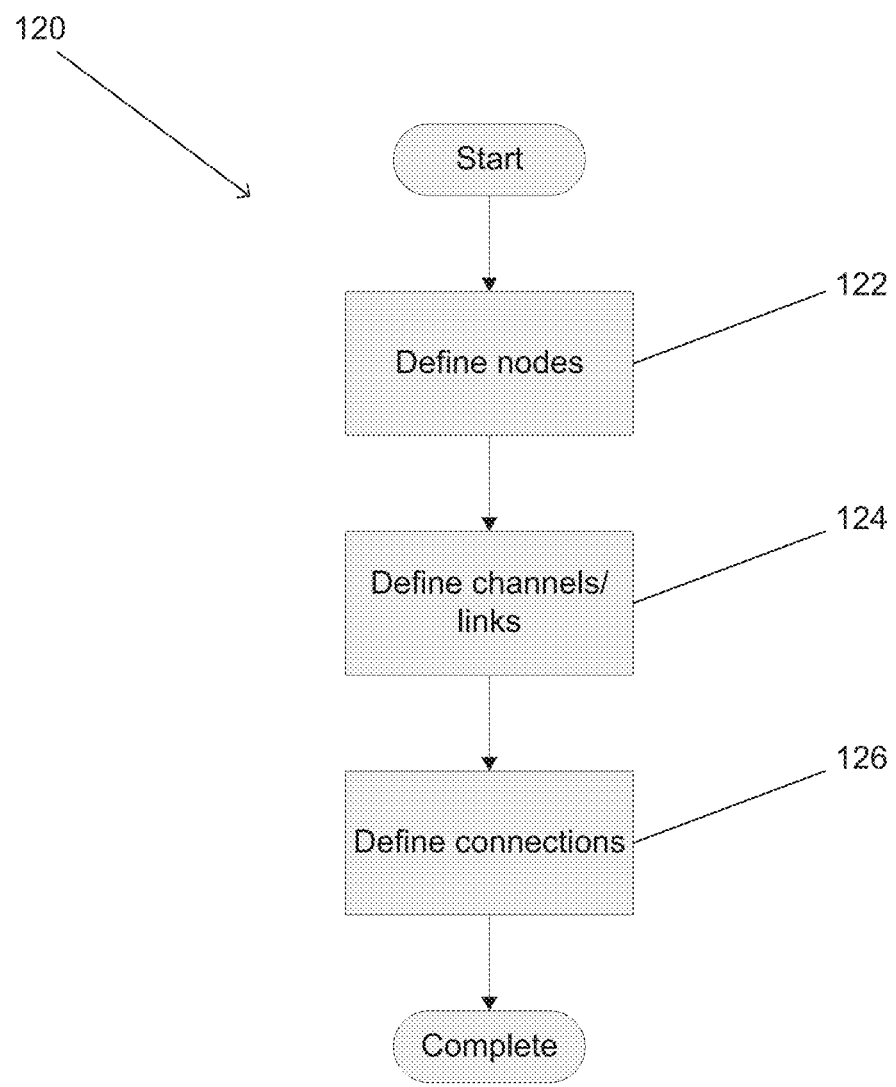
FIG. 2 is a flow chart illustrating a process for defining a network.

A process for describing a network model in accordance with an embodiment of the invention is illustrated in FIG. 2. The process 120 involves defining (122) the nodes within the network, which represent the individual transmitters and receivers within the network. The process then involves defining (124) the links and/or channels within the network. The links refer to the error-free capacitated links within the network, and the channels refer to the stochastic and/or multiterminal channels within the network. Once the nodes, and the links/channels within the network are defined, the demands on the network (i.e., the desired communication connections within the network) are defined (126). The combination of the nodes, the structure of the network, and the connections within the network form a model of a network that can be characterized by a network analyzer in accordance with embodiments of the invention. The manner in which connections can be defined within a network model in accordance with embodiments of the invention is described below.

Definition: Network Sources and Connections

The network analyzer analyzes network performance with respect to a collection of connections to be established across the network. The connections are described by a connection set $\mathcal{S}$. Each connection $s=(v, \mathcal{T}) \in \mathcal{S}$ describes a single transmitter $v \in \mathcal{V}$ and one or more receivers $\mathcal{T} \subseteq \mathcal{V} \setminus \{v\}$. The network source is a vector $U=(U_s : s \in \mathcal{S})$ of $|\mathcal{S}|$ source random variables defined by a source distribution p. Distribution p may describe a memoryless random process or a random process with memory. The nature of the sources and connections in accordance with an embodiment of the invention varies with the application. Examples of connection types consistent with embodiments of the invention include but are not limited to the following examples.

In some instances of the invention, the connections are lossless connections and the sources are independent. Lossless connections and independent sources are used, for example, in characterizing the capacity region of a network $\mathcal{N}$ under connections $\mathcal{S}$. Specifically, the capacity region $\mathcal{R}(\mathcal{N}, \mathcal{S})$ is the set of all rate vectors $(R_s : s \in \mathcal{S})$ such that when $(U_s : s \in \mathcal{S})$ is uniformly distributed on $\Pi_{s \in \mathcal{S}} \{1, \ldots, 2^{nR_s}\}$, it is possible to simultaneously and reliably deliver each source $U_s = U_{(v, \mathcal{T})}$ from node v to all of the receivers in $\mathcal{T}$ using n channel uses. In some instances of the invention, reliable information delivery means that the error probability of the information reconstruction at each receiver can be made arbitrarily small as the blocklength n grows without bound. In other instances of the invention, reliable information delivery means that the error probability of the information reconstruction at each receiver can be made precisely equal to zero for some n sufficiently large.

In many instances of the invention, the connections may allow imperfect (lossy) data reconstruction and/or the sources may be statistically dependent. Lossy data reconstruction and dependent sources are used, for example, in characterizing the optimal joint source-channel coding region of a network $\mathcal{N}$ under a source distribution p and connections $\mathcal{S}$. The joint source-channel coding region $\mathcal{J}(\mathcal{N}, p, \mathcal{S})$ is the set of all distortion vectors $(D_{s,t} : s=(v, \mathcal{T}) \in \mathcal{S}, t \in \mathcal{T})$ such that for each connection $s=(v, \mathcal{T}) \in \mathcal{S}$ and each receiver $t \in \mathcal{T}$, node t can reconstruct source $U_s$ with expected distortion no greater than $D_{s,t}$. The distortion measures used in the distortion constraint $D_{s,t}$ for each connection s and corresponding receiver t vary with the application to which the network analyzer is applied. In some instances, the distortion measures are identical for all connections and all receivers. In other instances, the distortion measure varies from connection to connection but is fixed for each connection. In several instances, the distortion measure for some connections varies among the receivers.

For example, in some embodiments, the distortion constraints for one connection are specified with respect to the squared error distortion measure while the distortion constraints for another connection are specified with respect to the Hamming distortion measure. In many embodiments, the distortion constraints for one or more connections $s=(v, \mathcal{T}) \in \mathcal{S}$ involve the reconstruction of source $U_s$ at receiver $t \in \mathcal{T}$ have expected distortion no greater than $D_{s,t}$ with respect to the absolute error distortion measure while the reconstruction of source $U_s$ at receiver $t' \in \mathcal{T}$ has expected distortion no greater than $D_{s,t'}$ with respect to the Hamming distortion measure. In some instances of the invention, one or more connections in the network represent functional demands. These instances are accommodated in the above framework by appropriate network definitions. For example, if $s_1=(v_1, T_1)$ and $s_2=(v_2, T_2)$ are two network connections ($s_1, s_2 \in \mathcal{S}$) with receiver set sizes $|T_1|=|T_2| \geq 0$ and node $v_2$ wishes to reconstruct the function $f(U_{s_1}, U_{s_2})$, defining a node $v_4$ to serve as transmitter for connection $s_3=(v_4, \{v_3\})$ with source $U_{s_3}=f(U_{s_1}, U_{s_2})$ implements the desired functional demand. If node $v_4$ is not connected to the rest of the network, then the reconstruction of source $U_{s_3}$ must be built using only descriptions from connected nodes.

Although specific examples of network models and connection types are described above, any of a variety of network models, node definitions, channel definitions, and connection definitions can be utilized in specifying a model of a network for characterization by a network analyzer in accordance with an embodiment of the invention. Before discussing the manner in which network analyzers in accordance with embodiments of the invention can characterize a network described using a network model similar to the network models described above, a discussion is provided below of various ways in which a network can be characterized.

Definition: Network Characterization

The network characterization that is the output of the network analyzer varies with the application for which the analysis is applied. In several embodiments, the network analyzer characterizes the network using a bound on the performance of a network $\mathcal{N}$ with respect to a given connection set $\mathcal{S}$ and source distribution p. For example, in some embodiments of the invention the network characterization is an inner or outer bound on the network capacity $\mathcal{R}(\mathcal{N}, \mathcal{S})$, or a bound on some function of the values in that region, e.g., a bound on the Lagragian $\max_{(R_s:s \in \mathcal{S}) \in \mathcal{R}(\mathcal{N}, \Theta)} \lambda_s R_s$ for some fixed positive constants ($\lambda_s : s \in \mathcal{S}$). In other embodiments of the invention, the network characterization is an equivalent or bounding network with respect to a desired performance metric, as defined below. In many embodiments, this equivalent or bounding network is simpler than the original network. For example, the bounding network is an equivalent or bounding network and has no stochastic components; or the bounding network has fewer nodes and/or edges and bounds the performance of the original network with respect to a given connection set $\mathcal{S}$.

Given a performance metric, a network $\mathcal{N}'$ is equivalent to input network $\mathcal{N}$ under connection set $\mathcal{S}$ if the performance of $\mathcal{N}'$ is identical to the performance of $\mathcal{N}$ under connection set $\mathcal{S}$. For example, network $\mathcal{N}'$ is equivalent to $\mathcal{N}$ with respect to capacity on connection set $\mathcal{S}$ if $\mathcal{R}(\mathcal{N}, \Theta) = \mathcal{R}(\mathcal{N}', \Theta)$. In many but not all instances of the network analyzer, the analyzer employs models that are equivalent for all possible connection sets ($\mathcal{R}(\mathcal{N}, \mathcal{S}) = \mathcal{R}(\mathcal{N}', \mathcal{S})$ for all $\mathcal{S}$). Similarly, network $\mathcal{N}'$ is an inner bounding network for $\mathcal{N}$ on connection set $\mathcal{S}$ if the set of achievable performances of $\mathcal{N}'$ is a subset of that of $\mathcal{N}$ over a given set of connections $\mathcal{S}$ and sources ($U_s:s \in \mathcal{S}$) (e.g., $\mathcal{R}(\mathcal{N}', \mathcal{S}) \subseteq \mathcal{R}(\mathcal{N}, \mathcal{S})$). In many but not all instances of the network analyzer, the analyzer employs bounding models that apply to all sources and connections. A network $\mathcal{N}'$ is an outer bounding network $\mathcal{N}$ for on connections $\mathcal{S}$ and sources ($U_s:s \in \mathcal{S}$) if $\mathcal{N}$ is an inner bounding network for $\mathcal{N}'$ on the given connections and sources.

Network Characterization Processes

Referring back to FIG. 1, once a network model defined in a manner similar to the various network models outlined above has been obtained (102) a process similar to the process 100 illustrated in FIG. 1 can be utilized to characterize the network. As was explained above, in many embodiments, the process of characterizing a network involves factoring the network model prior to attempting to characterize the model. Processes for factoring network models in accordance with embodiments of the invention are discussed below.

Factoring Networks

In many embodiments of the invention, where part or all of the network model is a distributional model, the distributional model is factored into smaller or simpler components. In some embodiments, this factoring algorithm precisely factors the network independent sub-networks. Precisely factoring a distributional model $p(y_1, \ldots, y_n | x_1, \ldots, x_m)$ of a network or sub-network involves finding a component set $\mathcal{E}$, a pair of partitions $\mathcal{P}=(P_e : e \in \mathcal{E})$ and $Q=(Q_3 : e \in \mathcal{E})$ for $\{1, \ldots, m\}$ and $\{1, \ldots, n\}$, respectively, and a collection of conditional distributions $\{p_e(y_e | x_e) : e \in \mathcal{E}\}$ for which $$p(y_1, \ldots, y_n | x_1, \ldots, x_m) = \prod_{e \in \mathcal{E}} p_e(y_e | x_e).$$

Here $x_e=(x_i : i \in P_e)$ and $y_e=(y_j : j \in Q_e)$ for each $e \in \mathcal{E}$, and a partition $(A_1, \ldots A_k)$ of a set A is a collection of subsets of $A (A_i \subseteq A)$ that do not intersect ($A_i \cap A_j = \emptyset$ for all $i \neq j$) and together contain all of the elements of $A (\cup_{i=1}^{k} A_i = A)$.

In other embodiments of the invention, the factoring algorithm involves finding a factored distributional model that is a bounding model for the original network. For example, given a network $\mathcal{N}$ which is characterized in part or in whole by a distributional model $p(y_1, \ldots, y_n | x_1, \ldots, x_m)$, in some instances of the invention, the factoring algorithm finds partitions $\mathcal{P}=(P_e : e \in \mathcal{E})$ for $\{1, \ldots, m\}$ and $Q=(Q_e : e \in \mathcal{E})$ for $\{1, \ldots, n\}$ and conditional distributions $p_e(y_e | x_e)$ for all $e \in \mathcal{E}$ such that the network $\mathcal{N}'$ that results when characterization $p(y_1, \ldots, y_n | x_1, \ldots, x_m)$ is replaced by the factored characterization $$p'(y_1, \ldots, y_n | x_1, \ldots, x_m) = \prod_{e \in \mathcal{E}} p_e(y_e | x_e)$$

gives an inner (outer) bounding network. That is, $\mathcal{R}(\mathcal{N}', \mathcal{R}) \subseteq \mathcal{R}(\mathcal{N}, \mathcal{S}) (\mathcal{R}(\mathcal{N}', \mathcal{R}) \supseteq \mathcal{R}(\mathcal{N}, \mathcal{R}))$ for all $\mathcal{R}$ or for a particular $\mathcal{R}$ of interest in instances that calculate capacity or $\mathcal{J}(\mathcal{N}',p,\mathcal{R}) \subseteq \mathcal{J}(\mathcal{N},p,\mathcal{R})(\mathcal{J}(\mathcal{N}',p,\mathcal{R}) \supseteq \mathcal{J}(\mathcal{N},p,\mathcal{R}))$ for all p and $\mathcal{R}$ or for a particular (p, $\mathcal{R}$) of interest in instances that calculate the joint source-channel coding region. For example, the paper M. Effros, "On dependence and delay: capacity bounds for wireless networks," *IEEE Wireless Communications and Networking Conference*, Paris, France, April 2012 (to appear), (the disclosure of which is hereby incorporated by reference in its entirety), shows that for any distributional channel model $p(y_1, \ldots, y_n | x_1, \ldots, x_m)$ for which $$p(y_1, \ldots, y_l | x_1, \ldots, x_k, x_{k+1}, \ldots, x_m) = p(y_1, \ldots, y_l | x_1, \ldots, x_k)$$

$$p(y_{l+1}, \ldots, y_n | x_1, \ldots, x_k, x_{k+1}, \ldots, x_m) = p(y_{l+1}, \ldots, y_n | x_{k+1}, \ldots, x_m),$$

the factored distributional model $$p(y_1, \ldots, y_l | x_1, \ldots, x_k) p(y_{l+1}, \ldots, y_n | x_{k+1}, \ldots, x_m)$$

is a lower bounding model for $p(y_1, \ldots, y_n | x_1, \ldots, x_m)$ from the perspective of capacity for all $\mathcal{R}$ and also a lower bounding model for $p(y_1, \ldots, y_n | x_1, \ldots, x_m)$ from the perspective of joint source-channel coding for all $(p, \mathcal{R})$.

In some embodiments, factoring is accomplished by fixing an input distribution and then running a distribution factoring algorithm on the resulting joint distribution. In several embodiments, the input distribution for each finite-alphabet input is the uniform distribution. In a number of embodiments, the input distribution for each real-valued input is an independent Gaussian distribution that satisfies all power constraints on that input. In certain embodiments, multiple input distributions are employed. A variety of processes can be used to factor a distribution. For example, Algorithm 3.5, "Finding the class PDAG characterizing the P-map of a distribution P" in the text book *Probabilistic Graphical Models* by D. Roller and N. Friedman is one example of an algorithm used for factoring distributions (the disclosure of which is incorporated by reference herein in its entirety). In other embodiments, any processes for factoring a network model appropriate to a specific network model and/or application can be utilized in accordance with embodiments of the invention.

In a number of embodiments, the factoring algorithm is a hierarchical factoring algorithm that first factors a distributional component of the network into sub-components and then applies the factoring algorithm to one or more of those sub-components. In some embodiments, the factoring algorithm is ran as a parallel algorithm, with simultaneous application of the factoring algorithm to multiple components run in parallel either on distinct processors of a single device or on distinct devices.

In many processes in accordance with embodiments of the invention, the distribution factoring algorithm employs conditional mutual information queries. For example, consider a model in which the alphabets of all network inputs $X_1, \ldots, X_m$ and all network outputs $Y_1, \ldots, Y_n$ are finite. Let A and B be subsets of $\{1, \ldots, m\}$ and $\{1, \ldots, n\}$, respectively, and let $X_A = (X_i : i \in A)$, $X_{A^c} = (X_i : i \in \{1, \ldots, m\} \setminus A)$, $Y_B = (Y_j : j \in B)$, and $Y_{B^c} = (Y_j : j \in \{1, \ldots, n\} \setminus B)$. Notice that $I(X_{A^c}; Y_B | X_A) = 0$ under the uniform distribution on $(X_1, \ldots, X_m)$ if and only if $I(X_{A^c}; Y_B | X_A = x_A) = 0$ for all possible values $x_A$ of $X_A$. Therefore $I(X_{A^c}; Y_B | X_A) = 0$ under the uniform distribution on $(X_1, \ldots, X_m)$ implies the conditional independence of $X_{A^c}$ and $Y_B$ given $X_A$ for all possible distributions $p(x_1, \ldots, x_m)$ on the component inputs. As a result, for any pair of sets $A \subseteq \{1, \ldots, m\}$ and $B \subseteq \{1, \ldots, n\}$ for which $$I(X_{A^c}; Y_B | X_A) + I(X_A; Y_{B^c}) + I(Y_B; Y_{B^c} | X_A, X_{A^c}) = 0,$$

the distribution $p(y_1, \ldots, y_n | x_1, \ldots, x_m)$ can be factored as $$p(y_1, \ldots, y_n | x_1, \ldots, x_m) = p(y_B | x_A) p(y_{B^c} x_{A^c}).$$

In several embodiments, finding such a set pair (A,B) and factoring the network into two components is one step in a factoring algorithm.

In a number of embodiments, applying the test

"Is $I(X_{A^c}; Y_B | X_A) + I(X_A; Y_{B^c} | X_{A^c}) + I(Y_B; Y_{B^c} | X_A, X_{A^c})$ equal to zero!"

to all candidate sets $A \subseteq \{1, \ldots, m\}$ and $B \subseteq \{1, \ldots, n\}$ with $|A| \leq k_1$ and $|B| \leq k_2$ finds all independent channels with at most $k_1$ inputs and at most $k_2$ outputs in the network. When $k_1$ and $k_2$ are finite, the number of possible sets A and B of the given sizes is polynomial in $|\mathcal{V}|$.

In some instances of the invention, where distributional model $p(y_1, \ldots, y_n | x_1, \ldots, x_m)$ is known to be built from independent channels each of which has at most $k_1$ inputs, the factorization $$p(y_1, \ldots, y_n | x_1, \ldots, x_m) = \prod_{e \in \mathcal{E}} p(y_e | x_e)$$

is found as follows. Choose an input distribution $$p(x_1, \ldots, x_m) = \prod_{i=1}^{m} p(x_i).$$

For each $j \in \{1, \ldots, n\}$, find the set $\mathcal{P} \subseteq \{1, \ldots, m\}$ defined as $$\mathcal{P}_j = \arg \min_{A: |A| \leq k_1} I(X_{A^c}; Y_j | X_A).$$

Since the inputs are drawn from an independent distribution, the function $f(A) = I(X_{A^c}; Y_j | X_A)$ is a submodular function, as shown in the paper T. S. Han, "The capacity region of general multiple-access channel with certain correlated sources," *Information and Control*, vol. 40, pp. 3760, January 1979, the disclosure of which is included by reference in its entirety. Hence, the solution of the described optimization problem can be found in polynomial time using methods known in sub-modular optimization. In some instances of the invention, the sub modular optimization algorithm described in the paper A. Schrijver, "A combinatorial algorithm minimizing submodular functions in strongly polynomial time," *Journal of Combinatorial Theory*, vol. 80, pp. 346355, 2000, is employed in this optimization. The disclosure of this paper is hereby included by reference in its entirety. After finding the sets $\mathcal{P}_j$ corresponding to each j, in some instances of the invention, the pair of partitions $(P_e : e \in \mathcal{E})$ and $(Q_e : e \in \mathcal{E})$ is formed by searching for the connected components in the bipartite graph constructed by connecting each $j \in \{1, \ldots, n\}$ to each $i \in \mathcal{P}_j$.

In some instances of the invention, the network's stochastic component is described not by a distributional model $p(y_1, \ldots, y_n|x_1, \ldots, x_n)$ but instead by r samples $$(x_{1,t}, \ldots, x_{m,t}, y_{1,t}, \ldots, y_{n,t}), t \in \{1, 2, \ldots r\},$$

drawn i.i.d. from distribution $$\prod_{i=1}^{m} p(x_i) p(y_1, \ldots, y_n | x_1, \ldots, x_m),$$

where $\Pi_{i=1}^{m} p(x_i)$ is an independent input distribution and $p(y_1, \ldots, y_n|x_1, \ldots, x_m)$ is the unknown channel distribution. In some instances of the given invention, the user inputs a bound $k_1$ on the maximal number of inputs per component ($k_1 \leq m$) and the factoring algorithm employs a model selection algorithm to find a factored model $$\prod_{e \in \mathcal{E}} p(y_e | x_e)$$

with at most $k_1$ inputs per component ($k_1 \leq m$) for the unknown distribution $p(y_1, \ldots, y_n|x_1, \ldots, x_m)$. The aim of the model selection algorithm is to select a model that fits the observed data without under-fitting or over-fitting. In some instances of the invention, this model selection process is accomplished using the well-known model selection methods of Bayesian or Schwarz information criterion (BIC) described in the paper Shwarz, G., "Estimating the dimension of a model," Ann. Statist., 6, 461-464, 1978, the disclosure of which is incorporated by reference in its entirety. According to BIC, for each $j \in \{1, \ldots, n\}$, $\mathcal{P}_j$ is set to the set A that minimizes $$\hat{H}(Y_j | X_A) + \left(\frac{\log r}{2r}\right)(|\mathcal{Y}_j| - 1) \prod_{i \in A} |X_i|,$$

over all $A \in \{1, \ldots, m\}$, such that $|A| \leq k_1$. For $A \subseteq \{1, \ldots, m\}$ and $j \in \{1, \ldots, n\}$, empirical conditional entropy $\hat{H}(Y_j|X_A)$ is defined as $$\hat{H}(Y_j | X_A) = - \sum_{y_j \in \mathcal{Y}_j, x_A \in \Pi_{i \in A} X_i} \hat{p}(x_A, y_j) \log \hat{p}(y_j | x_A),$$

and empirical conditional distribution $\hat{p}(y_j|x_A)$ of $y_j$ given $x_A$ is defined as $$\hat{p}(y_j | x_A) = \frac{\hat{p}(x_A, y_j)}{\hat{p}(x_A)},$$

where $$\hat{p}(x_A, y_j) = \frac{|\{t : (x_{A,t}, y_{j,t}) = (x_A, y_t), t = 1, \ldots, r\}|}{r},$$

and $$\hat{p}(x_A) = \frac{|\{t : x_{A,t} = x_A, t = 1, \ldots, r\}|}{r}.$$

Unlike function $f(A)$, function $$g(A) = \hat{H}(Y_j | X_A) + (2r)^{-1}(\log r)(|\mathcal{Y}_j| - 1) \prod_{i \in A} |X_i|$$

is not a submodular function. However, in the case where $|\mathcal{X}_1| = \ldots = |\mathcal{X}_m| \triangleq |\mathcal{X}|$, the solution of this optimization can still be found in polynomial time using the following procedure. For each $k \in \{1, \ldots, k_1\}$, find the set $A_k$ such that $$A_k = \underset{|A| \leq k}{\arg\min} \hat{H}(Y_j | X_A).$$

After performing these $k_1$ different optimizations, let $$\mathcal{P}_j = \arg \underset{A \in \{A_1, \ldots, A_{k_1}\}}{\min} \left[ \hat{H}(Y_j | X_A) + \left(\frac{\log r}{2r}\right)(|\mathcal{Y}_j| - 1) \|X\|^{|A|} \right].$$

Each of the $k_1$ optimizations required to find $A_1, \ldots, A_{k_1}$ consists of minimizing a submodular function subject to a modular constraint, and hence can be done efficiently in polynomial time.

Although specific factoring algorithms are discussed above, any of a variety processes appropriate to specific applications can be utilized for factoring of networks in accordance with embodiments of the invention.

Component Modification

In some instances of the network analyzer, part or all of the network (a network component) is replaced by an inner or outer bounding model with respect to the sources and connections of interest to the network component. If the inner and outer bounding model for a component are identical, then the component model is equivalent to the original component. Where calculation of network performance using current bounding network model(s) is too computationally intensive, the network analyzer can recursively simplify the bounding model by replacing components of the network with simpler bounding models. The recursion can proceed until the replacements yield a sufficiently simple bounding model as measured by a simplicity criterion, which is typically dependent on the application. Measures of simplicity may include (but are not limited to) numbers of nodes and/or edges in the network and/or temporal requirements on the run-time for the network characterization procedure. In some instances, this procedure for modifying the network facilitates or employs the application of computational bounding tools by the network analyzer.

Component Modification Processes

Figure 3:
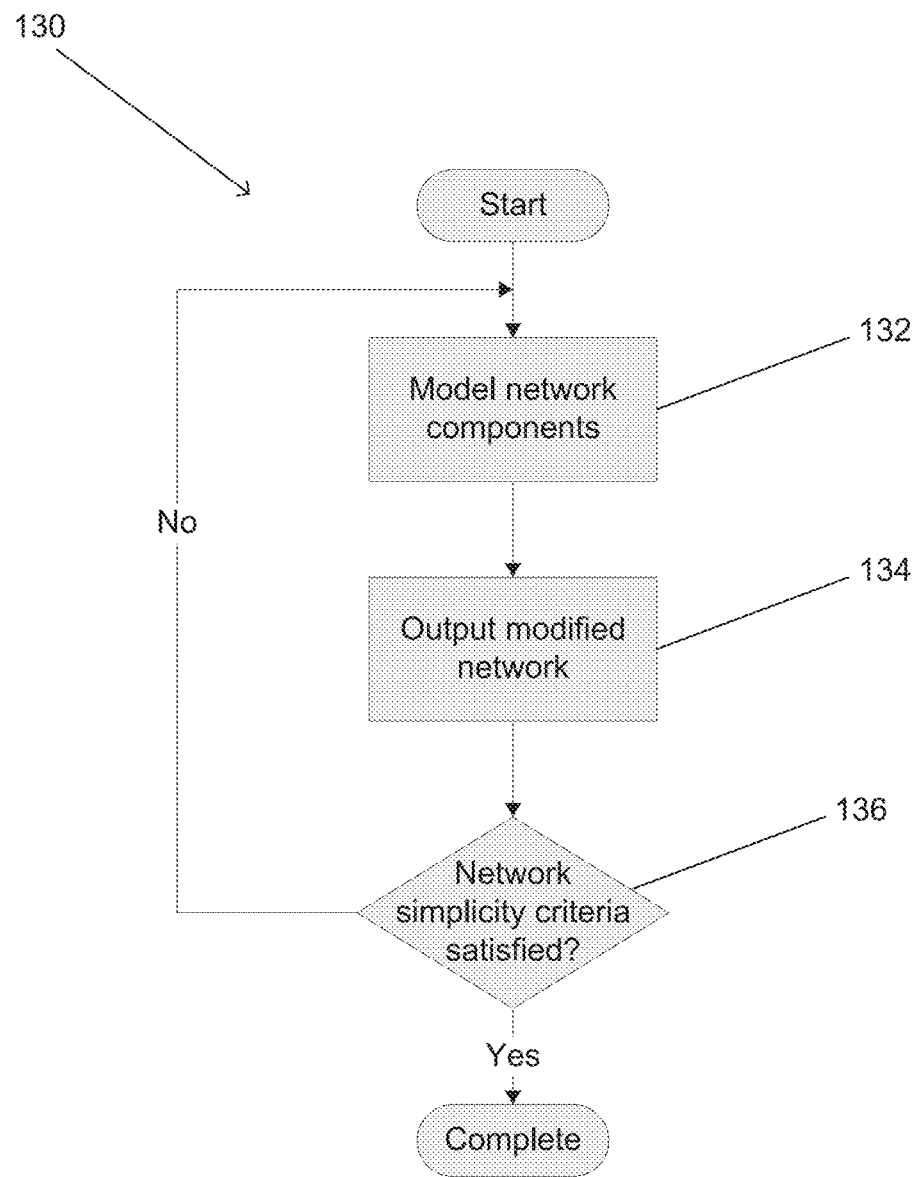
FIG. 3 is a flow chart illustrating a process for performing network substitution in accordance with an embodiment of the invention.

A process for modifying a network model to obtain a model that is capable of being characterized in accordance with an embodiment of the invention is illustrated in FIG. 3. The process 130 includes attempting to model (132) each of the components in the network with an equivalent model or an inner or outer bounding model with respect to the sources and connections associated with the component. Once a complete pass is made over the network model, the modified network model is output (134). In many embodiments, the modified network model is evaluated (136) to determine whether it is capable of being characterized by a network analyzer. In the event that the network model does not satisfy one or more predetermined simplicity criteria, the process iterates until the criteria are satisfied.

Although a specific component modification process is illustrated in FIG. 3, any of a variety of network modification processes capable of outputting a model that is capable of being characterized by a network analyzer in accordance with embodiments of the invention can be utilized. Specific component modification processes in accordance with embodiments of the invention are discussed further below.

Component Modification Processes

Figure 4:
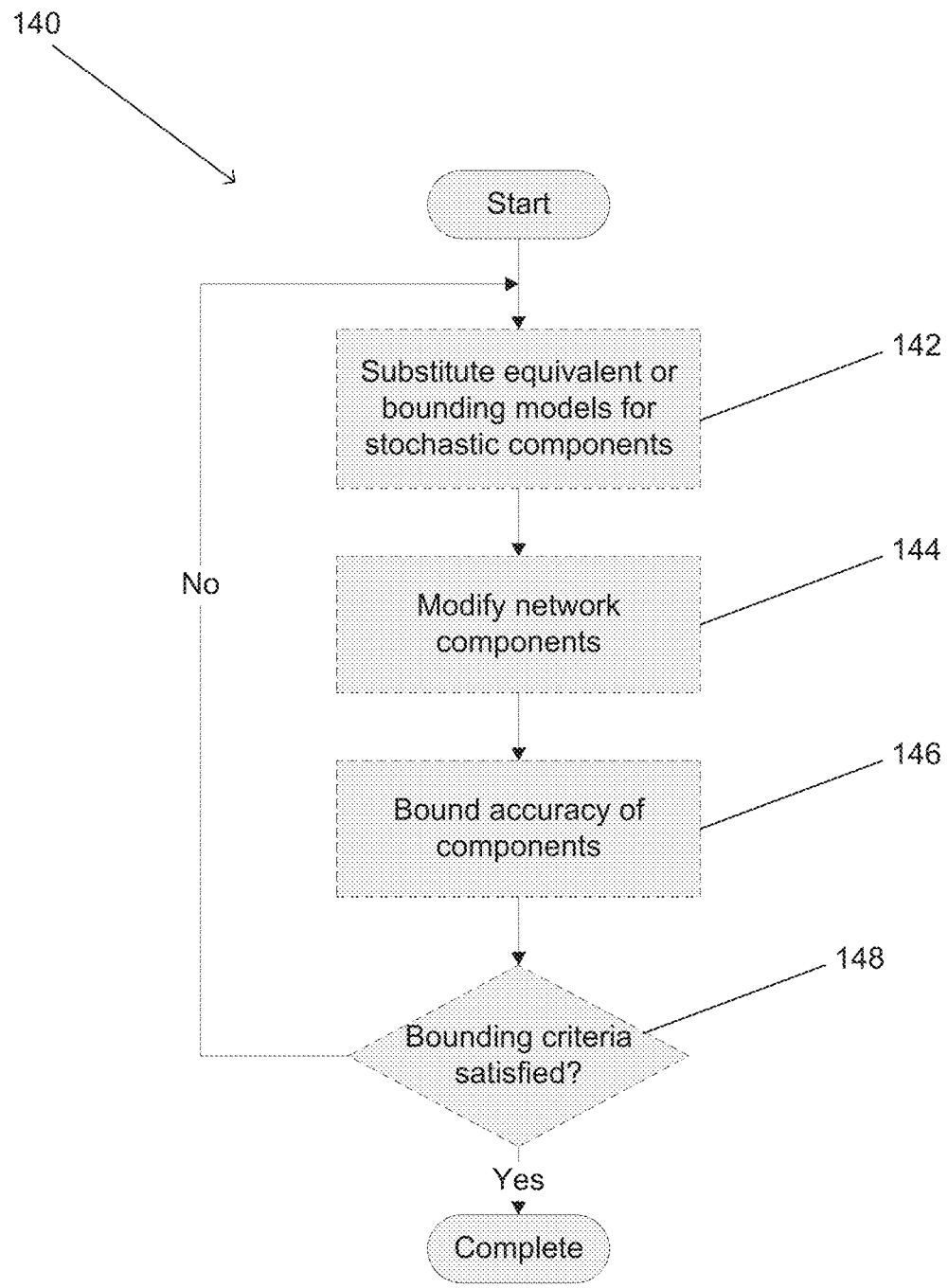
FIG. 4 is a flow chart illustrating a single iteration of a component substitution process in accordance with an embodiment of the invention.

Some methods for component modification can be applied to both stochastic components and bit-pipe components while others apply specifically to one component type or the other. A process for modifying components of a network model in accordance with an embodiment of the invention is illustrated in FIG. 4. The process 140 includes one or more of the following procedures.

In some instances of the invention, process 140 employs a procedure to substitute (142) equivalent networks, or inner (outer) bounding networks for stochastic components within the network model. The substitution can involve replacing a stochastic channel with either an equivalent network model or a bounding model that can be (but is not limited) a bit-pipe model. There are a number of ways in which the substitution can be achieved. In many instances, the network component can be looked up in a library of component substitutions. In other instances, a network model that is equivalent or bounding can be found by trial and error or as a solution to a collection of characterizing equations. In some instances of the invention, this solution is an optimized solution. Various techniques for obtaining equivalent or bounding network models in accordance with embodiments of the invention are discussed below.

In some instances of the invention, the process 140 includes a procedure to modify (144) the components of the network. The modification of the components of the network typically involves modifying the nodes and/or the capacitated links in the network to facilitate the characterization of the network.

In several embodiments, component modification processes involve additional operations involving the bounding (146) of the accuracy of the network models substituted for each of the components. Although not utilized in all instances, bounding (146) the accuracy of the models substituted for network components can aid in the identification of substitutions that are likely to reduce the accuracy of the overall characterization of the network.

In some instances of the invention, when accuracy bounds are used, the process can evaluate (148) whether specific bounding models are sufficiently accurate or whether alternative bounding models should be utilized. In which case, the process can iterate until a satisfactory set of modifications has been made. Various component modifications that can be applied to stochastic components and/or bit-pipe components in accordance with embodiments of the invention are discussed further below.

In many embodiments, the accuracy of component modifications can be assessed by comparing the inner and outer bounding models for a given component. Methods used for such comparisons are described further below. In several embodiments, the manner in which components are replaced is at least partially determined by the assessed accuracy of the inner and outer bounding models. In a number of embodiments, processes are utilized that seek to choose components that yield the tightest inner and outer bounding models.

Although specific processes are described below for modification of components, any of a variety processes appropriate to specific applications can be utilized to modify network components in accordance with embodiments of the invention.

Component Modification: Merging and Removing Nodes

One of the simplest operations for deriving an outer bounding network is merging nodes. Coalescing two nodes is equivalent to adding two links of infinite capacity—one from the first node to the second, and another from the second node to the first—thereby guaranteeing an outer bounding network under all connection types. When a pair of nodes, say $v_1$ and $v_2$, are combined to form a new node $v_3$, all outgoing connections (i.e., all $(v_1/\mathcal{T})\in \mathcal{S}$ and/or $(v_2, \mathcal{T}_2)\in \mathcal{S}$) and incoming connections (i.e., all $(v, \mathcal{T})\in \mathcal{S}$ for which $\mathcal{T} \cap \{v_1, v_2\}\neq \emptyset$) are reassigned to $v_3$. Thus $\mathcal{S}'$ replaces any $(v_1, \mathcal{T}_1)\in \mathcal{S}$ by $(v_3, \mathcal{T}_1)\in Y'$ and $(v_2, \mathcal{T}_2)\in \mathcal{S}$ by $(v_3, \mathcal{T}_2)\in \mathcal{S}'$ and replaces any $(v, \mathcal{T})\in \mathcal{S}$ with $\mathcal{T} \cap \{v_1,v_2\}\neq \emptyset$ by $(v, \mathcal{T}')$ where $\mathcal{T}'=((\mathcal{T}\setminus\{v_1,v_2\})\cup\{v_3\})$. Transmission and reception of channel inputs and outputs are likewise transferred from the prior separated nodes to the new combined node. For example, for any i such that $v_x(i)$ fell in set $\{v_1,v_2\}$ in the original network, $v_x(i)$ is set to $v_3$ in the modified network. Likewise, for any j such that $v_y(j)$ fell in set $\{v_1,v_2\}$ in the original network, $v_y(j)$ is set to $v_3$ in the modified network.

In some cases, nodes can be combined without affecting the network capacity. One simple example is when the sum of the capacities of the incoming links of a node v is less than the capacity of each of its outgoing links. In this situation, node v can be combined with all nodes w for which $(v,w)\in \mathcal{E}$ and node w has no other incoming links. Some examples of simple operations for deriving inner bounds include removing entire components, removing one or more channel inputs from any channel for which the input alphabet has a "no transmission" symbol, and removing channel outputs.

Component Modification: Stochastic Components

In many embodiments, the network analyzer replaces one or more independent stochastic components (channels) by corresponding bounding models. The models may take the form of stochastic models, or networks of bit pipes, or any combination of stochastic and deterministic components. From the perspective of capacity, if each model used in a replacement is both an inner bounding model and an outer bounding model for the channel that it replaces, then replacing those channels by their models yields an equivalent network.

In a number of embodiments, the bounding models used to determine bounds on network capacity only involve error-free capacitated links (lossless bit pipes). A channel model made of one or more lossless bit pipes is called a bit-pipe model. For the capacity problem, Koetter et al. have established that an arbitrary collection of network connections can be met on a network of noisy, independent, memoryless links if and only if it can be met on another network where each noisy link is replaced by a noiseless bit pipe with capacity equal to the noisy link capacity. Thus, a bit pipe is an equivalent model for a noisy link of the same capacity for ail possible connections $\mathcal{S}$. Likewise, a noisy link is an equivalent model for any other noisy link of the same capacity for all possible connections $\mathcal{S}$. This equivalence between noisy, memoryless links and noiseless bit pipes of the same capacity is established in the papers: R. Koetter, M. Effros, and M. Medard, "On a theory of network equivalence." *Proceedings of the IEEE Information Theory Workshop*, pages 326-330, Volos, Greece, June 2009; R. Koetter, M. Effros, and M. Mèdard, "A theory of network equivalence—Part I: Point-to-point channels." *IEEE Transactions on Information Theory*, pages 972-995, February 2011. The disclosure of the two papers by Koetter et al. is incorporated by reference herein in its entirety. Also for the capacity problem, Koetter et al. have established inner and outer bounding models for multiterminal channels that apply to all connection sets $S$. Koetter et al. give both general methods for deriving bounding models and examples of the results of those methods for broadcast, multiple access, and interference channels. Both the methods and the examples are described in the papers: R. Koetter, M, Effros, and M. Mèdard, "Beyond network equivalence." *Allerton Annual Conference on Communications, Control, and Computing*, Monticello, Ill., September 2010; R. Koetter, M. Effros, and M. Mèdard, "A theory of network equivalence, parts i and ii." *ArXiv e-prints*, July 2010. The disclosure of the two Koetter et al. papers is incorporated by reference herein in its entirety. Koetter et al. further propose developing bit-pipe models for a broad library of network components in such a way that the capacity of any network containing the given stochastic components can be bounded by the capacity of a network of noiseless bit pipes achieved by replacing each stochastic component by its corresponding bit-pipe model. The results demonstrate that for any known point in the capacity region (that is, for any achievability result) on any memoryless channel there exists a corresponding inner bounding bit-pipe model with topology and link capacities matched to the given point. This establishes both a large collection of bit-pipe models and a methodology for deriving bit-pipe models for new channels. The following are examples of bit-pipe models for the capacity problem.

Exemplary Bit Pipe Models

A number of bit-pipe models for the capacity problem are discussed below with reference to the bit-pipe models illustrated in FIGS. 5a-5d. Given any memoryless point-to-point channel ($\mathcal{X}$, p(y|x), $\mathcal{Y}$), the bit pipe shown in FIG. 5a of capacity $$C = \max_{p(x)} I(X; Y)$$

is an equivalent bit-pipe model.

Figure 5A:
FIGS. 5a-5d illustrate various bit-pipe models.
Figure 5B:
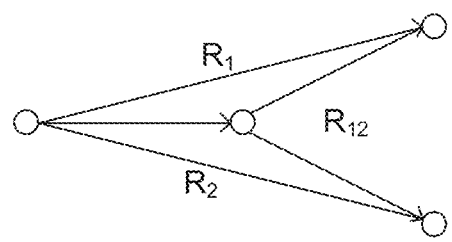

Consider a memoryless broadcast channel, $C = (\mathcal{X}, p(y_1, y_2|x), \mathcal{Y} \times \mathcal{Y})$. If $C$ is a physically degraded broadcast channel of the form $p(y_1,y_2|x)=p(y_1|x)p(y_2|y_1)$ or a stochastically degraded broadcast channel, so that there exists a pair of conditional distributions $p'(y_1,y_2|x)$ and $p'(y_2|y_1)$ such that $p'(y_1,y_2|x)=p(y_1|x)p'(y_2|y_1)$ and $p'(y_2|x)=p(y_2|x)$ for all $(x,y_2)$, then let $\mathcal{L}=\{(R_1,R_2,R_{12}):$ for some $p(u)p(x|u)p(y_1,y_2|x)$ $R_1 \leq I(X;Y_1|U), R_2+R_{12} \leq I(U;Y_2)\}$. Then for any $(R_1, R_2, R_{12}) \in \mathcal{L}$ the bit-pipe model shown in FIG. 5b is an inner bounding bit-pipe model for $C$. For any broadcast channel $C = (\mathcal{X}, p(y_1,y_2|x), \mathcal{Y} \times \mathcal{Y})$ (here no degradedness assumptions are employed), let $$\mathcal{U}_1 = \left\{(R_1, R_2, R_{12}): R_{12} \geq \max_{p(x)} I(X; Y_2), R_1 + R_{12} \geq \max_{p(x)} I(X; Y_1, Y_2)\right\}$$

$$\mathcal{U}_2 = \left\{(R_1, R_2, R_{12}): R_{12} \geq \max_{p(x)} I(X; Y_1), R_2 + R_{12} \geq \max_{p(x)} I(X; Y_1, Y_2)\right\}.$$

Then for any point $(R_1,R_2,R_{12}) \in \overline{(\mathcal{U}_1 \cup \mathcal{U}_2)}$, the bit-pipe model shown in FIG. 5b is an outer bounding bit-pipe model for $C$. (For any set A, $\overline{A}$ designates the convex closure of A.)

Figure 5C:
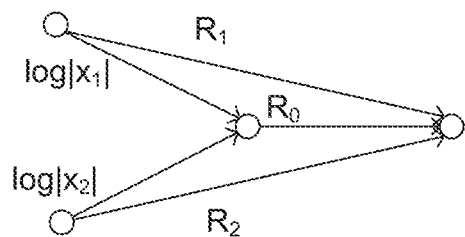

Consider a memoryless multiple access channel, $C = (\mathcal{X}_1 \times \mathcal{X}_2, p(y|x_1,x_2), \mathcal{Y})$. Let $\mathcal{L} = \{(R_0,R_1,R_2): R_1 \leq I(X_1;Y|X_2), R_2 \leq I(X_2;Y|X_1),$
$R_1+R_2 \leq I(X_1,X_2;Y), R_0=0$ for some $p(x_1)p(x_2)\}$ $\mathcal{U}_1 = \{(R_0,R_1,R_2):$ for each $p(x_1,x_2)$ there exists
$p(u|x_1)$ s.t. $|\mathcal{U}_1| \leq |\mathcal{X}_1|, R_1 \geq I(X_1;U), R_0 \geq I(X_1, X_2;Y|U)\}$ $\mathcal{U}_2 = \{(R_0,R_1,R_2):$ for each $p(x_1,x_2)$ there exists
$p(u|x_2)$ s.t. $|\mathcal{U}_1| \leq |\mathcal{X}_2|, R_2 \geq I(X_2;U), R_0 \geq I(X_1, X_2;Y|U)\}.$ Then for any $(R_0,R_1,R_2) \in \mathcal{L}$ the bit-pipe model shown in FIG. 5c is an inner bounding bit-pipe model for $C$, and for any $(R_0,R_1,R_2) \in \overline{(\mathcal{U}_1 \cup \mathcal{U}_2)}$ the bit-pipe model shown in FIG. 5c is an outer bounding bit-pipe model for $C$.

Figure 5D:
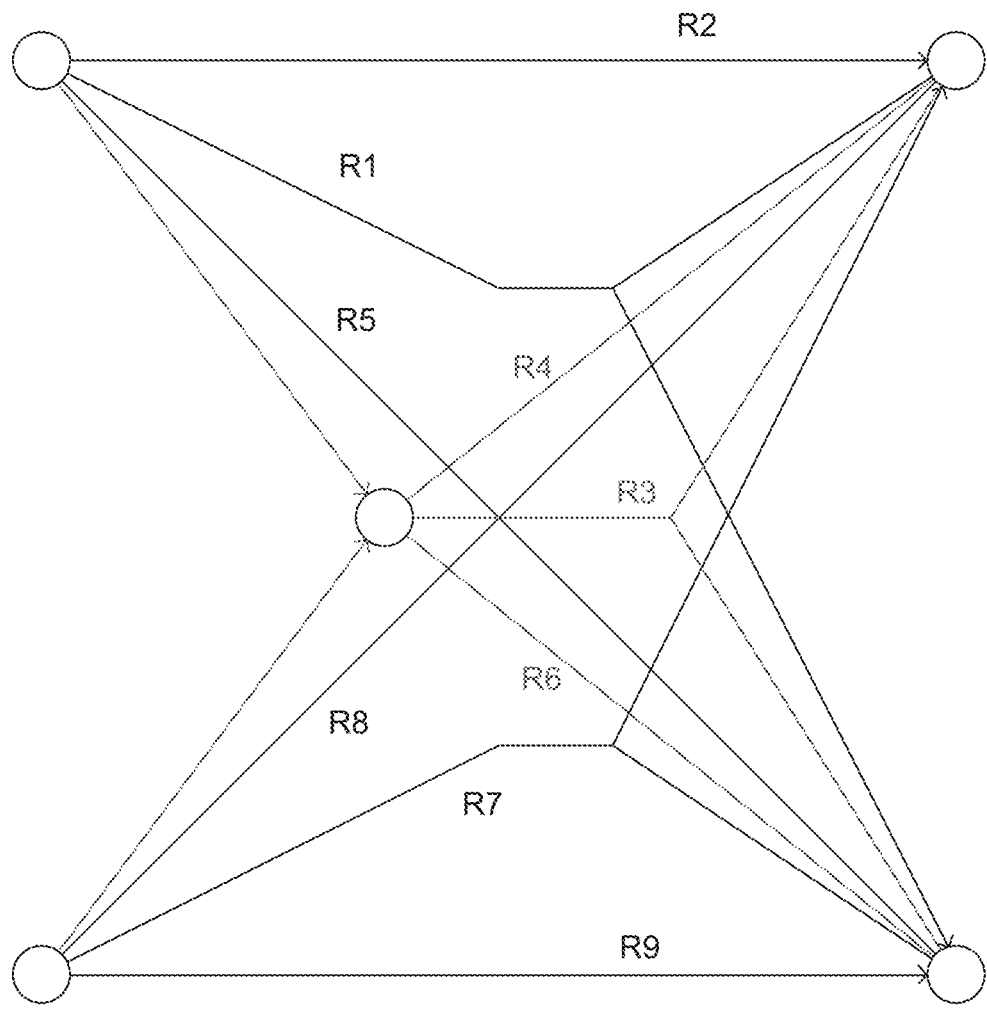

Consider a memoryless interference channel, $C = (\mathcal{X}_1 \times \mathcal{X}_2, p(y_1,y_2|x_1,x_2), \mathcal{Y}_1 \times \mathcal{Y}_2)$. Any existing achievability scheme for that interference channel represents an inner bounding model. An achievability scheme that can reliably deliver rate $R_1$ from transmitter 1 to both receivers, rate $R_2$ from transmitter 1 to receiver 1, rate $R_5$ from transmitter 1 to receiver 2 rate $R_7$ from transmitter 2 to both receivers, rate $R_8$ from transmitter 2 to receiver 1, and rate $R_9$ from transmitter 2 to receiver 2 provides an inner bounding model of the form shown in FIG. 5d with $R_3=R_4=R_6=0$. Let $\mathcal{U}_1 = \{(R_1, \ldots, R_9):$ for any $p(x_1,x_2), \exists p(u_1,u_2|x_1)$
s.t. $R_1 \geq I(X_1;U_2), R_2 \geq I(X_1;U_1|U_2), R_3 \geq I(X_1,X_2;Y_2|U_2), R_4 \geq I(X_1,X_2;Y_1|U_1,U_2,Y_2)\}$ $\mathcal{U}_1 = \{(R_1, \ldots, R_9):$ for any $p(x_1,x_2), \exists p(u_1,u_2|x_1)$
s.t. $R_1 \geq I(X_1 U_1), R_5 \geq I(X_1;U_2|U_1), R_3 \geq I(X_1,X_2;Y_1|U_1), R_6 \geq I(X_1,X_2;Y_2|U_1,U_2,Y_1)\}$ $\mathcal{U}_1 = \{(R_1, \ldots, R_9):$ for any $p(x_1,x_2), \exists p(u_1,u_2 651 x_2)$ s.t. $R_7 \geq I(X_2;U_2), R_8 \geq I(X_2;U_1|U_2), R_3 \geq I(X_1, X_2;Y_2|U_2), R_4 \geq I(X_1,X_2;Y_1|U_1,U_2,Y_2)\}$ $\mathcal{U}_1 = \{(R_1, \ldots, R_9):$ for any $p(x_1,x_2), \exists p(u_1,u_2|x_2)$
s.t. $R_7 \geq I(X_2;U_1), R_9 \geq I(X_2;U_2|U_1), R_3 624 I(X_1, X_2;Y_1|U_1), R_6 \geq I(X_1,X_2;Y_2|U_1,U_2,Y_1)\}$ Then for any $(R_1, \ldots, R_9) \in \overline{(\mathcal{U}_1 \cup \mathcal{U}_2 \cup \mathcal{U}_3 \cup \mathcal{U}_4)}$, the model shown in FIG. 5d is an outer bounding model.

Equivalent and bounding models for the capacity problem are often derived through the solution of information theoretic problems such as those described in the above examples. In some cases, solutions to those information theoretic problems are solved analytically and placed into a dictionary of component models. Some embodiments of the invention employ computational tools to derive new component models and add those component models to the library when the library contains no prior component model for a component of interest. For example, given a channel $C = (\mathcal{X}, p(y|x), \mathcal{Y})$ for which there is no bounding model currently in the dictionary, some embodiments employ the Blahut-Arimoto algorithm to derive the channel capacity, which implies an equivalent model as described above. Solutions for other information theoretic characterizations, such as the characterizations corresponding to the broadcast, multiple access, and interference channels can likewise be derived computationally using the methodologies described in W.-H. Gu and M. Effros, "On approximating the rate region for source coding with coded side information," *In the Proceedings of the IEEE Information Theory Workshop*, pages 432-435, Lake Tahoe, Calif., September 2007 and W.-H. Gu and S. Jana and M. Effros, "On approximating the rate regions for lossy source coding with coded and uncoded side information", *In the Proceedings of the IEEE International Symposium on Information Theory*, pages 2162-2166, Toronto, Canada, July 2008. The disclosure of the papers by W.-H. Gu and Effros and W.-H. Gu et al. is incorporated by reference herein in its entirety.

Jalali and Effros have established similar results for the joint source-channel coding problem to those described above for the capacity problem. They show first that an arbitrary collection of joint source-channel connections can be met on a network of noisy, independent, memoryless links if and only if it can be met on another network where each noisy link is replaced by a noiseless bit pipe with capacity equal to the noisy link capacity. The interchangeability of noisy, memoryless links with noiseless bit pipes for this problem is described in the papers: S. Jalali and M. Effros, "On the separation of lossy source-network coding and channel coding in wireline networks," *Proceedings of the IEEE International Symposium on Information Theory*, pages 500-504, Austin, Tex., June 2010; S. Jalali and M. Effros, "On the separation of lossy source-network coding and channel coding in wireline networks" *ArXiv e-prints*, May 2010; and S. Jalali and M. Effros, "Separation of source-network coding and channel coding in wireline networks," Information Theory and Applications Workshop, San Diego, Calif., February 2011. They then demonstrate general conditions under which a bit-pipe model can be shown to be an inner or outer bounding model from the perspective of joint source-channel connections. These results appear in S. Jalali and M. Effros, "On distortion bounds for dependent sources over wireless networks" IEEE International Symposium on Information Theory, Saint Petersburg, Russia, August 2011. The disclosure of the papers by Jalali and Effros referenced above are incorporated by reference herein in their entirety.

Although specific components and equivalent and bounding bit-pipe models for specific metrics are discussed in the above referenced papers, network analyzers can utilize bounding and equivalent bit-pipe models to replace additional and/or alternative components of stochastic network models for the same and other metrics as appropriate to specific applications in accordance with embodiments of the invention.

Component Modification: Bit-pipe Components

In several embodiments where part or all of either the original network or an equivalent or bounding network obtained in a prior step is a noiseless, acyclic, wireline network, a network analyzer can apply component modifications aimed at simplifying the graphical model. In some instances, the modifications result in fewer links and/or nodes in the component model. In other instances, the modifications result in more links and/or nodes but aid network evaluation or establish an opportunity for greater network simplification in a later iteration of the modification process. In both cases, the replacement structure has the same inputs and outputs as the original. In this way, bounding models for the component preserve bounds for all connections whose inputs and outputs are outside the modified component.

Consider two networks of noiseless bit pipes, $\mathcal{N} = (\mathcal{V}, \mathcal{E})$ and $\mathcal{E}' = (\mathcal{V}', \mathcal{E})$. Network $\mathcal{N}$ may be the original network, a bounding network for the original network, or a subnetwork of either an original network or a bounding network. For each edge $e \in \mathcal{E}$, the capacity of bit pipe e is $C_e$. For each edge $e' \in \mathcal{E}$, the capacity of bit pipe e' is $C_{e'}$. Network $\mathcal{N}$ has a set $I \subset \mathcal{V}$ of input nodes which have no incoming links in $\mathcal{N}$, and a set $O \subset \mathcal{V}$ of output nodes which have no outgoing links in $\mathcal{N}$. Each node $v \in I \cup O$ maps to a node $\phi(v) \in \mathcal{V}'$. Two nodes v, v'∈I∪O may, potentially, map to the same node $\mathcal{V}'$, in which case $\phi(v) = (v')$. One way to prove that network $\mathcal{N}'$ is an outer bounding model $\mathcal{N}'$ for is to demonstrate that every function $f = (f_t : t \in O)$ of the inputs incoming to the source nodes $v \in I$ that can be reconstructed at each respective sink node $t \in O$ can also be reconstructed at the corresponding sinks ($\phi(t):t \in O$) when the same inputs are applied to the nodes ($\phi(v):v \in I$) in $\mathcal{N}'$. One way to show that network $\mathcal{N}'$ is an inner bounding model for $\mathcal{N}'$ is to show that $\mathcal{N}'$ is an outer bounding model for $\mathcal{N}'$. The given definitions apply to a variety of network metrics including the capacity and joint source-channel metrics. If $\mathcal{N}'$ is both an outer bounding model and an inner bounding model for $\mathcal{N}'$, then $\mathcal{N}'$ and $\mathcal{N}'$ are equivalent.

One possible operation for obtaining inner or outer bounding networks is reducing or increasing individual link capacities. As a special case of such operations, one can reduce the capacity of a link to zero, which is the same as deleting the link. In some cases reducing/increasing link capacities is helpful in simplifying the network. For example, one simplification operation that can be performed in accordance with embodiments of the invention involves removing a set $\mathcal{A}$ of links or components to obtain an inner bound. An outer bound with the same topology can be obtained by adding sufficient capacity to the remaining network to be able to carry any information that could have been carried by the set $\mathcal{A}$.

In some instances of the invention, an inner or outer bounding network is found with the aid of an optimization algorithm. For example, in some embodiments, a linear program is applied to find the minimum factor k by which uniformly scaling up the capacities of one network gives an outer bounding model of another network. For example, consider two networks of noiseless bit pipes, $\mathcal{N}' = (\mathcal{V}', \mathcal{E})$ and $\mathcal{N}' = (\mathcal{V}', \mathcal{E}')$ as described above. Associate a commodity with each link $e \in \mathcal{E}$. A path segment including multiple adjacent links without intermediate branching points is treated as a single logical link with a single associated commodity; the effective capacity of that composite link equals the capacity of the minimum of the constituent links' capacities. The ratios of the capacities of incoming and outgoing links of a node $v \in \mathcal{V}$ define the ratios with which the commodities associated with incoming links are coded together to form commodities associated with the outgoing links. For each pair $(e,e') \in \mathcal{E} \times \mathcal{E}'$, let $f_{e,e'}$ be the fraction of the flow on link $e \in \mathcal{E}$ that is carried on link $e' \in \mathcal{E}'$. For each pair $(v,v') \in \mathcal{V} \times \mathcal{V}'$, let $r_{v,v'}$ be the fraction of the coding operations associated with node $v \in \mathcal{V}$ that are carried out at node $v' \in \mathcal{V}'$. The following linear program finds the minimum factor k by which scaling up the capacities of links in $\mathcal{E}'$ uniformly gives an outer bounding network for $\mathcal{N}$.

Minimize k subject to $$r_{v,\phi(v)} = 1 \forall v \in I \cup O$$

$$0 \leq f_{e,e'} \leq 1 \forall (e, e') \in \mathcal{E} \times \mathcal{E}'$$

$$0 \leq r_{v,v'} \leq 1 \forall (v, v') \in \mathcal{V} \times \mathcal{V}'$$

-continued $$\sum_{e} f_{e,e'} C_e \leq k C_{e'} \forall e' \in \mathcal{E}'$$

$$\sum_{e' \in In(v')} f_{e,e'} + r_{Start(e),v'} = \sum_{e' \in Out(v')} f_{e,e'} + r_{End(e),v'} \forall (e, v') \in \mathcal{E} \times \mathcal{V}'.$$

If the network $\mathcal{N}'$ can be obtained from network $\mathcal{N}$ by removing some collection of edges, then $\mathcal{N}'$ is an inner bounding model for $\mathcal{N}$, and the network $\mathcal{N}''$ with vertices $\mathcal{V}'$, edges $\mathcal{E}'$ and edge capacities $kC_{e'}$ for each edge $e' \in \mathcal{E}'$ is an outer bounding model for $\mathcal{N}$. Here k is the output of the above linear program. This gives a multiplicative bound of k on the potential capacity difference associated with the inner and outer bounding operations, as discussed in a later section.

As is clear to one of ordinary skill in the art, the above algorithm generalizes to optimize the individual link capacities for an arbitrary outer bounding model topology. In particular, replacing $kC_{e'}$ (here k is a variable and $C_{e'}$ is fixed) in the above equations by a variable $C_{e'}$ (to be optimized by the algorithm) creates a new set of equations that is linear in the variables $C_{e'}$, $e' \in \mathcal{E}'$. Applying an optimization algorithm to optimize an objective function that relies on these variables subject to the given constraints provides a mechanism for optimizing outer bounding models subject to a variety of objective functions. For example, applying a linear programming algorithm to optimize a Lagrangian sum of the edge capacities $C_{e'}$ gives an outer bounding model on the outer convex hull of the space of such models.

Another type of operation for simplifying networks are operations based on network cut-sets. A cut $P=(\mathcal{V}'_1, \mathcal{V}'_2)$ between two sets of nodes $\mathcal{W}'_1$ and $\mathcal{W}'_2$ is a partition of the network nodes $\mathcal{V}$ into two sets $\mathcal{V}'_1$ and $\mathcal{V}'_2$ such that $\mathcal{W}'_1 \subseteq \mathcal{V}'_2$. The capacity of a cut is defined as the sum of capacities of the forward links of the cut, i.e., links (v,w) such that $v \in \mathcal{V}'_1$, $w \in \mathcal{V}'_2$, giving $$C_P = \sum C_{(v,w)}.$$

A minimal cut P* between sets $\mathcal{W}'_1$ and $\mathcal{W}'_2$ is a cut P between $\mathcal{W}'_1$ and $\mathcal{W}'_2$ that minimizes capacity. That is, $$P^* = \arg\min_{(\mathcal{V}_1, \mathcal{V}_2): \mathcal{W}_1 \subseteq \mathcal{V}_1, \mathcal{W}_2 \subseteq \mathcal{V}_2, \mathcal{V}_1 \cap \mathcal{V}_2 = \emptyset, \mathcal{V}_1 \cup \mathcal{V}_2 = \mathcal{V}} C_{(\mathcal{V}_1, \mathcal{V}_2)}.$$

Links $(v,w) \in \mathcal{E}$ such that $v \in \mathcal{V}'_2$ and $w \in \mathcal{V}'_1$ are called backward links of cut $(\mathcal{V}'_1, \mathcal{V}'_2)$. One example of an operation based on network cuts is as follows. If a minimum cut can be found separating a sink from its corresponding sources and all other sink nodes, and the forward links can be directly connected to the sink node while preserving all of the backward links, then an outer-bounding network results. If instead of keeping the backward links, the backward links are deleted, an inner-bounding network is obtained. In the case where there are no backward links, this procedure results in an equivalent network. In many embodiments, this procedure is repealed for every sink.

Figure 6:
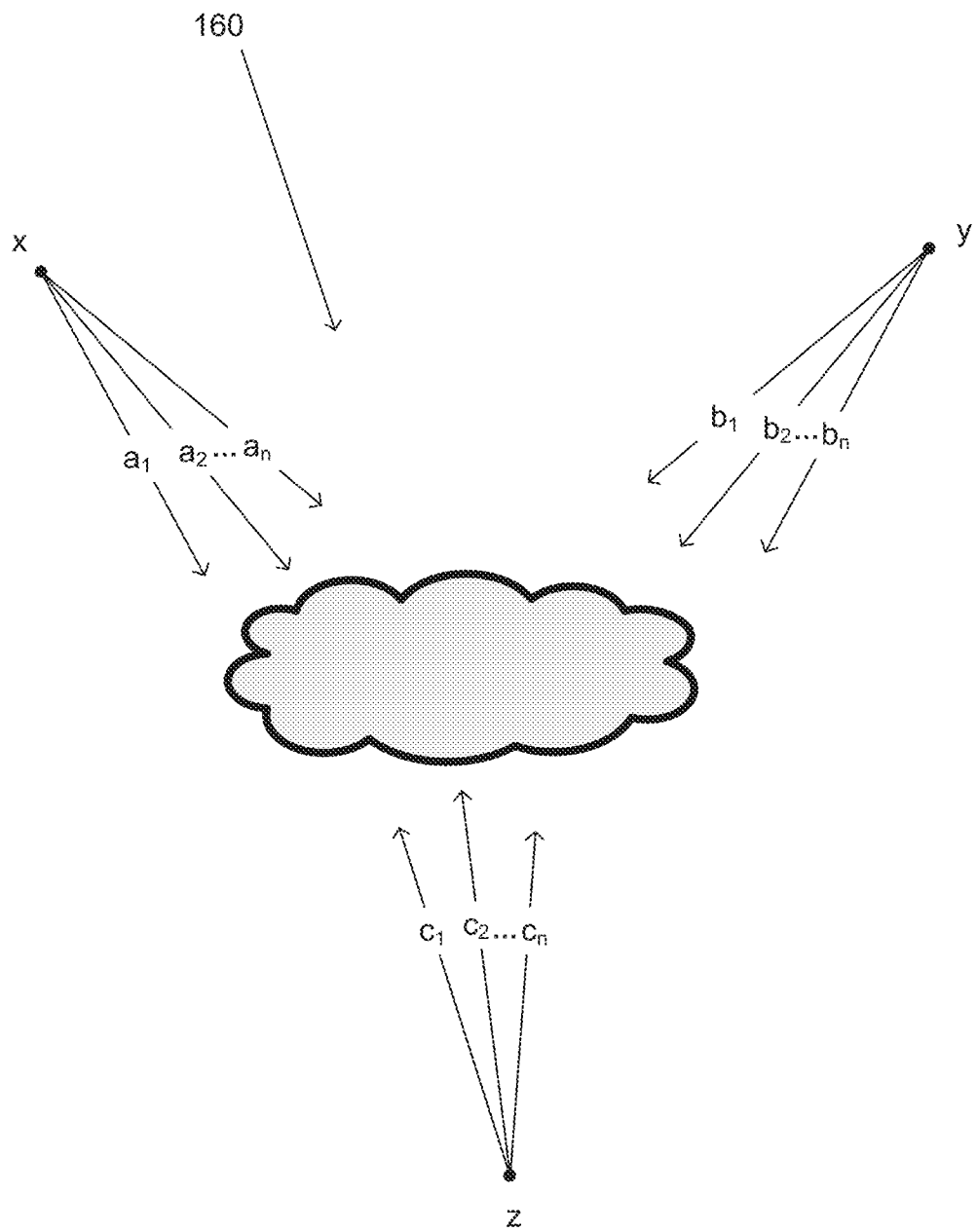
FIG. 6 illustrates a generalized network topology including two source nodes and one sink node.
Figure 7:
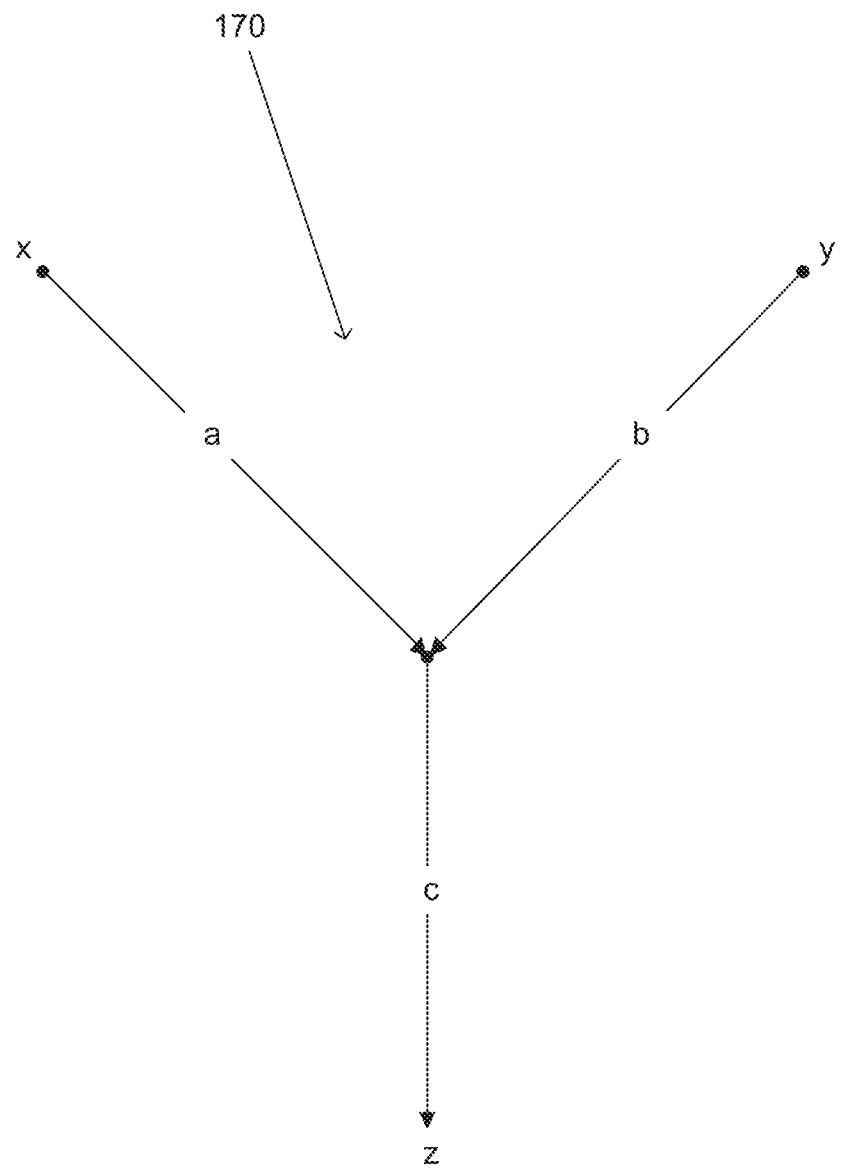
FIG. 7 illustrates a Y-shaped network topology include two source nodes and one sink node.

The simplification operations described above are described in detail in T. Ho, M. Effros, and S. Jalali, "On equivalence between network topologies", *Allerton Annual Conference on Communications, Control, and Computing*, Monticello, Ill., September 2010 and M. Effros, T. Ho, and S. Jalali, "On Equivalence Between Network Topologies", *ArXiv e-prints*, October 2010, the disclosure of which is incorporated herein by reference in its entirety. The processes described in those papers generalize to large classes of network topologies. For example, consider the network $\mathcal{N}_1$ (160) shown in FIG. 6. The Y-network $Y(\Sigma a_i, \Sigma b_i, \Sigma c_i)$ (170) shown in FIG. 7 is an outer bound for the network $\mathcal{N}$. If the network analyzer can determine that $\mathcal{N}$ contains two capacity-disjoint Y-networks of the form $Y(\alpha \Sigma a_i, \alpha \Sigma b_i, \alpha \Sigma c_i)$ and $Y((1-\alpha)\Sigma a_i, (1-\alpha)\Sigma b_i, (1-\alpha)\Sigma c_i)$, then $Y(\Sigma a_i, \Sigma b_i, \Sigma c_i)$ is also an inner bound for, and thus equivalent to, $\mathcal{N}$. This construction can also be generalized by replacing the basic T-shaped topology by other topologies with arbitrary numbers of inputs and outputs. The star-shaped topology is one simple example.

Although specific simplification operations are described above, any of a variety of simplification operations can be utilized that enable the replacement of a subnetwork within a bit-pipe model with bounding models that simplify the calculation of the capacity bounds of the network in accordance with embodiments of the invention.

In some instances, replacements are performed hierarchically, replacing portions of the network that resulted from a prior analysis with a model derived in a later analysis. Bounding the accuracy of inner and outer bounding networks is easier when the topologies of the inner and outer bounding networks match. As a result, in some instances of the current invention, the analysis performed by the network analyzer applies inner and outer bounding models with the same topologies.

Although the analysis described above utilizes an acyclic graph, analysis can also be applied in graphs with cycles. In some instances of the current invention, the cyclic network is replaced by an acyclic time-expanded network and the analysis is applied to that network.

Besides its generality, another benefit of the proposed recursive graph-based approach is that it allows computation to be traded off against tightness of obtained bounds in accordance with the requirements of a specific application. In some embodiments, analysis is applied directly to the noisy network either before or after noisy channel modeling or sub-network modeling. For example, replacing two nodes in a network with a single node that receives all channel outputs and controls all channel inputs from the removed nodes always yields an outer bounding model. Likewise, removing one or more channel outputs at any node in a network always yields an inner bounding model. In some embodiments, such simplifications are applied before component modeling. Each of these techniques applies for both bit-pipe models and probabilistic models and each is employed in some embodiments. Although specific processes are described above for modification of bit-pipe components, any of a variety processes appropriate to specific applications can be utilized to modify bit-pipe components in accordance with embodiments of the invention.

Bounding Network Performance

Referring back to FIG. 1, the network model output by a component modification process (106), similar to one of the component modification processes described above, can be characterized (108) in order to characterize the performance of the original network. In many embodiments, the characterization (108) involves bounding the performance of the network model obtained using the component modification process. Processes for bounding network performance in accordance with embodiments of the invention are discussed below.

Network analyzers in accordance with many embodiments of the invention calculate or bound the performance of a bounding or equivalent network. In some cases, the performance of a network of error-free capacitated links can be obtained analytically. In several embodiments, the performance of the bounding or equivalent network is calculated analytically—thereby calculating or bounding the performance of the original network. (Analytical calculation of the performance of an inner (outer) bounding network guarantees an inner (outer) bound on the performance of the original network.) In several embodiments, the capacity of the bounding networks is computed analytically using techniques similar to those described in M. Effros, "Capacity bounds for networks of broadcast channels" *Proceedings of the IEEE International Symposium on Information Theory*, pages 580-584, Austin, Tex., June 2010, the disclosure of which is incorporated by reference herein in its entirety.

In several embodiments, when the connection types fall in the family of connection types for which cut-set bounds on capacity are tight, capacity of a bounding network is computed by calculating capacity cut-set bounds on the equivalent/bounding network.

In many embodiments, the network analyzer bounds the performance of the original network by bounding the performance of the bounding network. Inner (outer) bounds on the performance of inner (outer) bounding networks guarantee inner (outer) bounds on the original network. Any of a number of computational techniques can be utilized to give a bounding characterization of a network. For example, when the bounding model is a bit-pipe network and the metric of interest is capacity, possible techniques include (but are not limited to) those disclosed in the following papers: L. Song, R. W. Yeung, and N. Cai, "Zero-error network coding for acyclic networks." *IEEE Transactions on Information Theory*, 52(6):2345-3139, July 2003; N. Harvey, R. Kleinberg, and A. R. Lehman, "On the capacity of information networks." *IEEE Transactions on Information Theory*, 52(6):2345-2364, June 2006; and A. T. Subramanian and A. Thangaraj, "A simple algebraic formulation for the scalar linear network coding problem" *ArXiv e-prints*, July 2008. The disclosure of the papers by Song et al., Harvey et al, and Subramanian and Thangaraj are hereby incorporated by reference in their entirety. The specific technique selected for bounding the network of error-free capacitated links depends upon the specific network and the requirements of the specific application.

Inner bounds on network performance can be obtained by restricting attention to special families of codes and then finding the performance of any code within the given family. The tightest inner bound for a given family of codes is achieved by the best code in the given family. Examples of coding families include routing solutions, scalar linear codes, vector linear codes, abelian codes, and matroidal codes. Techniques for finding inner bounds include but are not limited to the techniques described in the following papers, which are incorporated by reference herein in their entirety. The paper Cannons, Dougherty, and Zeger, "Network routing capacity," *IEEE Transactions on Information Theory*, 52(3):777-788, March 2006 includes one example of an inner bounding technique for network capacity on networks of lossless links. The Cannons et al. paper is incorporated by reference herein in its entirety. The routing capacity describes the rates at which information can be delivered through a network using the best routing solution. Since the routing solution is achievable, the routing capacity guarantees an inner bound. The routing capacity can be found using a linear programming solution, as described in the referenced work. The paper T. Ho, "Polynomial-time algorithms for coding across multiple unicasts," *ArXiv e-prints*, April 2006 (the disclosure of which is incorporated herein by reference in its entirety) describes a polynomial-time algorithm for finding an optimal code among codes that employ only pairwise XOR coding operations. The algorithm uses a linear programming approach to find a code in the given class. Given a collection of unicast connections (that is, a collection of connections $S$ such that in each connection a single sender sends information to a single receiver ($|T|=1$ for all $s=(v, \mathcal{T}) \in S$)) and a corresponding vector of rates, the algorithm succeeds in finding a solution for those connections at those rates if there exists a solution of a slightly higher rate. As a result, the algorithm can be used to find inner bounds on the multiple unicast capacity region. While the algorithm, as described in that work, focuses on finding solutions to multiple unicast connections, it can also be applied to find inner bounds for general connections using a result from the paper R. Dougherty and K. Zeger "Nonreversibility and equivalent constructions of multiple-unicast networks," *IEEE Transactions on Information Theory*, 52(11):5067-5077, November 2006 (the disclosure of which is hereby incorporated by reference in its entirety). That paper shows that for any network with arbitrary connection set $S$ (e.g., $S$ may contain both unicast connections $((x_1, \mathcal{T}_1) \in S$ s.t. $|\mathcal{T}_1|=1)$ and multicast connections $(x_2, \mathcal{T}_2)| S$ s.t. $|\mathcal{T}_2|>1))$, there exists another network $\mathcal{N}'$ and connection set $S'$ with only unicast connections ($S'=\{(s_1, \mathcal{T}_1), \ldots, (s_k, \mathcal{T}_k)\}$ s.t. $|\mathcal{T}_i|=1 \forall 1 \le i \le k$) such that connections $S$ can be established on network $\mathcal{N}$ if and only if connections $S'$ can be established on network $\mathcal{N}'$. The argument is constructive—meaning that given any network $\mathcal{N}$ and demands $S$, the paper by Dougherty and Zeger describes an explicit technique for deriving network $\mathcal{N}'$ and its corresponding multiple unicast demands $S$. Running the algorithm by Ho to find an inner bound on the multiple unicast capacity $\mathcal{R}(\mathcal{N}', S')$ of the resulting network then gives an explicit inner bound on the capacity under general demands for the original network. The paper by Subramanian and Thangaraj referenced above describes an algebraic formulation for characterizing scalar linear network coding solutions. Here each solution corresponds to a polynomial of degree less than or equal to two; solving the polynomial equation for a desired collection of rates demonstrates the achievability of those rates using scalar linear codes. Again, the complexity of the solution grows with the number of edges in the network.

In a number of embodiments, the network analyzer employs an optimization algorithm to find an inner or outer bound on the joint source-channel coding region. In some embodiments, the core of the algorithm is a linear program. Two examples of such linear programs are described in the paper M. Effros, "On source and networks: can computational tools derive information theoretic limits" Allerton Conference on Communication, Control, and Computing, 2011. Let $\mathcal{N} =(\mathcal{V}, \mathcal{E})$ be a directed, acyclic graph in which each $e \in \mathcal{E}$ is a noiseless bit pipe of capacity $C_e$. Let $S$ be a collection of connections. Let p(u) be a distribution on source vector $(U_s : s \in S)$. The network analyzer can find an outer bound on the collection of distortion vectors $(D_{s,t} : s= (v,T) \in S, j \in T)$, where distortion $D_{s,t}$ is an expected distortion with respect to distortion measure $d_{s,t}(U_s:s\in\mathcal{S})$ that can be achieved across network $\mathcal{N}$ under source distribution $p(u)$ of network $\mathcal{N}$. Let $(U_s:s\in\mathcal{S})$ be the source vector, $(U_e:e\in\mathcal{E})$ be the vector of edge messages, and $(\hat{U}_{s,t}:s=(v,\mathcal{T})\in\mathcal{S},t\in\mathcal{T})$ be a collection of reconstructions at the receivers. Then for each $e\in\mathcal{E}$, $U_e$ is the message traversing edge $e$, and for each $s=(v,\mathcal{T})\in\mathcal{S}$ and each $t\in\mathcal{S}$, $\hat{U}_{s,t}$ is the reconstruction of source $U_s$ at receiver $t$. For each subset $A\subseteq\mathcal{S}$, $U_A=(U_s:s\in A)$ and $H(U_A)$ is the entropy of $U_A$ under distribution $p$. The alphabet of $U_s$ for each $s\in\mathcal{S}$ may be discrete or continuous. For each $v\in\mathcal{V}$, let $$U_v=((U_s:s=(v,\mathcal{T})\in\mathcal{S}),(U_e:e\in In(v)));$$

that is, $U_v$ describes all inputs (both sources and messages traversing incoming edges) to node $v$. In the linear program, there is a variable $h_A$ for each subset $A$ of the set $\mathcal{A}=\{U_s:s\in\mathcal{S}\}\cup\{U_e:e\in\mathcal{E}\}\cup\{\hat{U}_{s,t}:s=(v,\mathcal{T})\in\mathcal{S},t\in\mathcal{T}\}$. For notational simplicity, the set brackets for set $A$ are often dropped; thus $h_{\{U_s,U_v\}}$ and $h_{U_s,U_v}$ refer to the same variable. Let $D_{s,t}(R)$ be the distortion-rate function for source $s$ according to distortion measure $d_{s,t}(\cdot,\cdot)$. The space of distortion vectors $(D_{s,t}(h_{U_s}+h_{\hat{U}_{s,t}}-h_{U_s,\hat{U}_{s,t}}):s=(v,\mathcal{T})\in\mathcal{S},t\in\mathcal{T})$ for which $$h_A=H(U_A)\forall A\subseteq\mathcal{S},|A|>0$$

$$h_{U_{(v,v')},U_v}-h_{U_v}=0\forall(v,v')\in\mathcal{E}$$

$$h_{\hat{U}_{s,t},U_t}-h_{U_t}=0\forall s=(v,\mathcal{T})\in\mathcal{S},t\in\mathcal{T}$$

$$h_{U_e}\leq C_e\forall e\in\mathcal{E}$$

$$h_A\geq 0\forall A\subseteq\mathcal{A}\setminus\mathcal{S},|A|>0$$

$$h_A-h_B\geq 0\forall B\subset A\subseteq\mathcal{A},|B|>0$$

$$h_{A\cup C}+h_{B\cup C}-h_{A\cup B\cup C}-h(C)\geq 0\forall A,B,C\subseteq\mathcal{A},|A|,|B|,|C|>0$$

provide an outer bound on the joint source-channel coding region $\mathcal{J}(\mathcal{N},p,\mathcal{S})$. In many embodiments, the network analyzer uses linear programming to find the outer boundary of this region.

In other embodiments, a network analyzer finds an inner boundary on the set of distortions achievable by joint-source-channel coding by finding an inner bound on the capacity region for independent sources under connections $\mathcal{S}$ and evaluating the distortion-rate function at those rates. For example, if rate vector $(R_s:s\in\mathcal{S})$ is achievable for connections $\mathcal{S}$, then distortion vector $(D_{s,t}(R_s):s=(v,\mathcal{T}),t\in\mathcal{T})$ with distortion measure $d_{s,t}(u,\hat{u})=d_s(u,\hat{u})$ for each $s=(v,\mathcal{T})\in\mathcal{S}$ and all $t\in\mathcal{T}$ gives an inner bound on the joint source-channel coding region for network $\mathcal{S}$ with (with independent or dependent) sources $(U_s:s\in\mathcal{S})$.

Although specific processes are described above for bounding network performance, any of a variety of processes appropriate to specific applications can be utilized to determine bounds for the network performance in accordance with embodiments of the invention.

Assessing Accuracy of Network Characterizations

Whether the network analysis produces bounds on network performance or a bounding model for the network, for many applications it is useful to obtain not only the network analysis but also an assessment of the accuracy of that analysis. Many network analyzers in accordance with embodiments of the invention include assessments of bounding accuracy as part of the network analysis.

In some embodiments, these assessments compare the regions computed as inner and outer bounds on the network performance and return one or more measures of their closeness. For example, in some embodiments, $\mathcal{R}_I(\mathcal{N},\mathcal{S})$ and $\mathcal{R}_O(\mathcal{N},\mathcal{S})$ are inner and outer bounds, respectively, on the capacity region of a network $\mathcal{N}$ under connections $\mathcal{S}$ ($\mathcal{R}_I(\mathcal{N},\mathcal{S})\subseteq\mathcal{R}(\mathcal{N},\mathcal{S})\subseteq\mathcal{R}_O(\mathcal{N},\mathcal{S})$) found by the network analyzer and $\mathcal{R}_O^o(\mathcal{N},\mathcal{S})$ is the outer boundary of the outer bounding region. In some instances, the network analyzer bounds the accuracy of the given bounds with a worst measure of accuracy such as (but not limited to)

$$d(\mathcal{R}_I(N,S),\mathcal{R}_O(N,S))=\max_{r_O\in\mathcal{R}_O(N,S)}\min_{r_I\in\mathcal{R}_I(N,S)}d(r_O,r_I).$$

or an average measure of accuracy such as (but not limited to)

$$d(\mathcal{R}_I(N,S),\mathcal{R}_O(N,S))=\frac{\int_{r_O\in\mathcal{R}_O^o(N,S)}\min_{r_I\in\mathcal{R}_O}d(r_O,r_I)dr_O}{\int_{r_O\in\mathcal{R}_O^o(N,S)}dr_O},$$

where $d(r,r')$ captures some notion of distance or distortion (e.g., $d(r,r')=\|r-r'\|$).

When the network analysis derives or employs inner and outer bounding models $\mathcal{N}_I$ and $\mathcal{N}_O$ for a network $\mathcal{N}$, network analyzers in accordance with several embodiments of the invention bound the accuracy of the bounding models by comparing the inner and outer bounding networks to each other. Here network $\mathcal{N}$ may be a network, a component of a larger network, or a bounding model for either a network or a component. In some instances, the network analyzer bounds the difference between the performance of a network or component $\mathcal{N}$ and the performance of models $\mathcal{N}_I$ and $\mathcal{N}_O$ using a bound such as (but not limited to) the bounds described in the paper M. Effros, "On capacity outer bounds for a simple family of wireless networks", *Information Theory and Applications Workshop*, San Diego, Calif., 2010, the disclosure of which is incorporated herein by reference in its entirety. As is discussed further below, the process for obtaining inner and outer bounding networks for subnetworks within a general network depends upon the nature of the network.

When comparing inner and outer bounding networks $\mathcal{N}_I$ and $\mathcal{N}_O$ for which the stochastic elements of $\bot_I$ and $\mathcal{V}_O$, if any, are identical and the topologies of all graphical components of $\mathcal{V}_I$ and $\mathcal{V}_O$ are identical $((\mathcal{V}_I,\mathcal{E}_I)=(\mathcal{V}_O,\mathcal{E}_O)=(\mathcal{V},\mathcal{E}))$ though the capacities $C_e(\mathcal{V}_I),C_e(\mathcal{V}_O)>0$ for all $e\in\mathcal{E}$ may differ, the following difference factor between $\mathcal{V}_I$ and $\mathcal{V}_O$ can be used $$\delta(\mathcal{N}_I,\mathcal{N}_O)=\min_{e\in\mathcal{E}}\frac{C_e(\mathcal{N}_I)}{C_e(\mathcal{N}_O)}.$$

Note that $\delta(\mathcal{V}_I,\mathcal{V}_O)\in(0,1]$, and $\delta(\mathcal{V}_I,\bot_O)=1$ if and only if the inner and outer bounds are identical and therefore equivalent to the network $\mathcal{V}$. Given a fixed connection set $\mathcal{S}$, let $\mathcal{R}$ denote the capacity region under connections $\mathcal{S}$ either of the network $\mathcal{V}$ or of a larger network of interest that contains $\mathcal{V}$ as a component. Let $\mathcal{R}_I(\mathcal{R}_O)$ denote the capacity region with respect to the same connections of the network that results when $\mathcal{V}$ is replaced by $\mathcal{V}_I(\mathcal{V}_O)$ in the network corresponding to $\mathcal{R}$. Then $$\mathcal{R}_I \subseteq \mathcal{R} \subseteq \mathcal{R}_O,$$

while $$\delta(\mathcal{V}_I, \mathcal{V}_O) \cdot \mathcal{R}_O \subseteq \mathcal{R}_I,$$

For any integer k, any set $A \subseteq \mathrm{IR}^k$ of k-dimensional real vectors, and any constant c, the set c·A is here defined as c·A={$(cr_1, \ldots, cr_k):(r_1, \ldots, r_k) \in A$}. As a result, $$\delta(\mathcal{N}_I, \mathcal{N}_O) \cdot \mathcal{R}_O \subseteq \mathcal{R} \subseteq \mathcal{R}_O$$

$$\mathcal{R}_I \subseteq \mathcal{R} \subseteq (1/\delta(\mathcal{N}_I, \mathcal{N}_O)) \cdot \mathcal{R}_I$$

In some embodiments of the network analyzer, $\delta(\mathcal{N}_I, \mathcal{N}_O)$ is used as a measure of bounding accuracy.

For some connection sets $\mathcal{S}$, cut-set bounds on the capacity are tight for networks of noiseless links. For other connection sets $\mathcal{S}$, cut-set bounds on the capacity are not tight but provide a simple characterization of network properties, estimates of network performance. As a result, cut-set bounds are also used in some instances of the network analyzer as measures of the differences between inner and outer bounding models for a network or network component. Consider an arbitrary network or component $\mathcal{N}$. Let $\mathcal{N}_I$ and $\mathcal{N}_O$ be inner and outer bounding models for $\mathcal{N}$, where $\mathcal{N}_I$ and $\mathcal{N}_O$ are made entirely of noiseless bit pipes. Let $\mathcal{S}$ be the connection set of interest, and define the input set $\mathcal{M}$ as $\mathcal{M} = \{v : \exists \mathcal{T} \neq \emptyset \text{ s.t. } (v, \mathcal{T}) \in \mathcal{S}\}$ and the output set $\mathcal{M}'$ as $\mathcal{M}' = \{t : \exists (v, \mathcal{T}) \in \mathcal{S} \text{ s.t. } t \in \mathcal{T}\}$. Given any non-empty, non-intersecting sets $A \subseteq \mathcal{M}$ and $B \subseteq \mathcal{M}'$, let $P_I(A,B)$ be the set of cut sets between A and B in $\mathcal{N}_I$ and $P_O(A,B)$ be the set of cut sets between A and B in $\mathcal{N}_O$. Then $$\rho(\mathcal{N}_I, \mathcal{N}_O) = \max_{(A,B): A \subseteq \mathcal{M}, B \subseteq \mathcal{M}', A \cap B = \emptyset} \left[ \min_{P \in \mathcal{P}_O(A,B)} C_P(\mathcal{N}_O) - \min_{P \in \mathcal{P}_I(A,B)} C_P(\mathcal{N}_I) \right]$$

measures the maximal difference in minimal cut capacities for all cuts between input and output nodes in $\mathcal{N}_I$ and $\mathcal{N}_O$. Note that $\rho(\mathcal{N}_I, \mathcal{N}_O) \geq 0$ by definition of inner and outer bounding networks. Let $\mathcal{R}$ denote the capacity region either of the network $\mathcal{N}$ or of a larger network of interest that contains $\mathcal{N}$ as a component. Let $\mathcal{R}_I(\mathcal{R}_O)$ denote the capacity region of the network that results when $\mathcal{N}$ is replaced by $\mathcal{N}_I(\mathcal{N}_O)$ in the network corresponding to $\mathcal{R}$. If capacities $\mathcal{R}$, $\mathcal{R}_I$ and $\mathcal{R}_O$ are taken with respect to some connection type for which cut-set bounds are tight, then $$\mathcal{R}_I \subseteq \mathcal{R} \subseteq \mathcal{R}_O,$$

while $$(\mathcal{R}_O - \rho(\mathcal{N}_I, \mathcal{N}_O) \cdot 1)^+ \subseteq \mathcal{N}_I,$$

where for any integer k, any set $A \subseteq \mathrm{IR}^k$, and any constant c, $$(A - c \cdot 1)^+ = \{((r_1 - c)^+, \ldots, (r_k - c)^+):(r_1, \ldots, r_k) \in A\}$$

and $(a)^+$ equals a if $a \geq 0$ and 0 otherwise. As a result, $$(\mathcal{R}_O - \rho(\mathcal{N}_I, \mathcal{N}_O) \cdot 1)^+ \subseteq \mathcal{R} \subseteq \mathcal{R}_O$$

$$\mathcal{R}_I \subseteq \mathcal{R} \subseteq \mathcal{R}_I + \rho(\mathcal{N}_I, \mathcal{N}_O) \cdot 1,$$

where for any $c \geq 0$, $$A + c \cdot 1 = \{(r_1 + c, \ldots, r_k + c):(r_1, \ldots, r_k) \in A\}.$$

In some embodiments of the network analyzer, $\rho(\mathcal{N}_I, \mathcal{N}_O)$ is used as a measure of bounding accuracy.

The paper M. Effros, "On capacity outer bounds for a simple family of wireless networks," *Information Theory and Applications Workshop*, San Diego, Calif., 2010, (incorporated above) describes some of the above measures of accuracy.

In some embodiments of the network analyzer, the analyzer bounds the accuracy of the model by bounding the impact on the network characterization of one or more noiseless capacitated links. For example, the paper S. Jalali, M. Effros, T. Ho, "On the impact of a single edge on the network coding capacity," *Information Theory and Applications Workshop*, San Diego, Calif., 2011, incorporated herein by reference in its entirety, bounds the maximal difference in capacity between a network and another network that is identical except for the removal of a single noiseless, capacitated link.

In many embodiments, network analyzers determine whether the accuracy of the network performance bound is below a predetermined threshold and repeat the process of deriving new bounding models in an attempt to improve that accuracy. Although specific processes are described above for determining the network performance and bounding assessment accuracy, any of a variety processes appropriate to specific applications can be utilized to determine bounds for the network performance and to bound assessment accuracy in accordance with embodiments of the invention.

While the above description contains many specific embodiments of the invention, these should not be construed as limitations on the scope of the invention, but rather as an example of one embodiment thereof. For example, although many embodiments replace noisy links with bounding bit-pipe models, several embodiments utilize simplification tools that are directly applicable to noisy networks. Accordingly, the scope of the invention should be determined not by the embodiments illustrated, but by the appended claims and their equivalents.

What is claimed is:

1. A network analyzer configured to characterize a communication network, comprising:
    a processor configured to:
        obtain an initial model of the communication network in which the capacities of individual network components are known, where the initial model comprises:
            a definition of individual transmitters and receivers within the communication network;
            a definition of a structure of the communication network; and
            a definition of connections within the communication network;
        determine that a specific network performance characteristic of the initial model cannot be directly characterized despite knowing the capacities of individual network components and the structure of the communication network by identifying a component of the initial model in a library of component substitutions;

when the specific network performance characteristic of the initial model cannot be directly characterized, automatically perform at least one substitution that replaces the identified component of the initial network model with at least one model selected from the group consisting of an equivalent model and a bounding model to produce a simplified network model that is capable of being characterized by the network analyzer, where the at least one model used to perform the at least one substitution is associated with the identified component in the library of component substitutions; and characterize the specific network performance characteristic of the initial model by characterizing the simplified network model.

2. The network analyzer of claim 1, wherein the specific network performance characteristic of the initial model that cannot be directly characterized is a performance characteristic selected from the group consisting of:

maximal data rate;

minimal distortion with which data can be delivered;

latency; and robustness to component failures.

3. The network analyzer of claim 1, wherein the definition of the structure of the communication network includes the definition of at least one of:

a capacitated bit pipe; and a stochastic channel.

4. The network analyzer of claim 1, wherein the at least one substitution includes substituting an equivalent or bounding network model for at least one stochastic component of the initial model.

5. The network analyzer of claim 4, wherein the at least one stochastic component is replaced with an equivalent or bounding bit-pipe model.

6. The network analyzer of claim 1, wherein the at least one substitution includes substituting an equivalent or bounding network model for at least one deterministic component of the initial model.

7. The network analyzer of claim 1, wherein the at least one substitution includes modifying at least one bit-pipe component of the initial model.

8. The network analyzer of claim 1, wherein the processor is configured to bound the accuracy of at least one of the models substituted for a component of the initial model to evaluate the impact of the substitution on the accuracy with which the network analyzer can characterize the initial model.

9. The network analyzer of claim 1, wherein the processor is configured to characterize the simplified network model by outputting the simplified network model.

10. The network analyzer of claim 1, wherein the processor is configured to characterize the simplified network model by bounding the specific network performance characteristic of the simplified network model.

11. The network analyzer of claim 10, wherein the bound on the specific network performance characteristic of the simplified network model is selected from the group consisting of:

a bound with respect to the capacity region of the simplified network model;

a bounding network on the capacity region of the simplified network model;

a bound on the joint source-channel coding region of the simplified network model; and a bounding network on the joint source-channel coding region of the simplified network model.

12. The network analyzer of claim 10, wherein the processor is further configured to assess the bounding accuracy of the bound on the specific network performance characteristic of the simplified network model.

13. The network analyzer of claim 12, wherein the processor is configured to repeat the at least one substitution using at least one alternative substitution in the event that the bounding accuracy of the characterization of the simplified network model is not sufficiently accurate.

14. The network analyzer of claim 1, wherein the processor is further configured to factor the initial network model by partitioning the network into a series of independent network components.

15. The network analyzer of claim 1, wherein the processor is further configured to perform the at least one substitution as part of a recursive substitution process in which components of the initial network model are replaced with equivalent or bounding models to produce a simplified network that is capable of being characterized by the network analyzer.

16. The network analyzer of claim 15, wherein the recursive substitution process is a hierarchical substitution process.

17. A network analyzer configured to characterize a communication network, comprising:

a processor configured to:

obtain an initial model of the communication network in which the capacities of individual network components are known, where the initial model comprises:

a definition of individual transmitters and receivers within the communication network;

a definition of a structure of the communication network; and a definition of connections within the communication network;

determine that a specific network performance characteristic of the initial model cannot be directly characterized despite knowing the capacities of individual network components and the structure of the communication network by identifying a component of the initial model in a library of component substitutions;

when the specific network performance characteristic of the initial model cannot be directly characterized, automatically factor the identified component of the initial model by partitioning the network model into a series of independent network components that form a simplified network model that is capable of being characterized by the network analyzer; and characterize the specific network performance characteristic of the initial model by characterizing the simplified network model.

18. The network analyzer of claim 17, wherein the specific network performance characteristic of the initial model that cannot be directly characterized is a performance characteristic selected from the group consisting of:

maximal data rate;

minimal distortion with which data can be delivered;

latency; and robustness to component failures.

19. A method of characterizing a communication network, comprising:
- obtaining an initial model of the communication network in which the capacities of individual network components are known, where the initial model comprises:
  - a definition of individual transmitters and receivers within the communication network;
  - a definition of a structure of the communication network; and
  - a definition of connections within the communication network;
- determining that a specific network performance characteristic of the initial model cannot be directly characterized despite knowing the capacities of individual network components and the structure of the communication network by identifying a component of the initial model in a library of component substitutions;
- when the specific network performance characteristic of the initial model cannot be directly characterized, automatically performing at least one substitution that replaces the identified component of the initial network model with at least one model selected from the group consisting of an equivalent model and a bounding model to produce a simplified network model that is capable of being characterized by the network analyzer, where the at least one model used to perform the at least one substitution is associated with the identified component in the library of component substitutions; and
- characterizing the specific network performance characteristic of the initial model by characterizing the simplified network model.

20. The method of claim 19, wherein the specific network performance characteristic of the initial model that cannot be directly characterized is a performance characteristic selected from the group consisting of:
- maximal data rate;
- minimal distortion with which data can be delivered;
- latency; and
- robustness to component failures.

* * * * *